(12) United States Patent
Ozeki

(10) Patent No.: US 11,174,954 B2
(45) Date of Patent: Nov. 16, 2021

(54) CONTROL VALVE

(71) Applicant: YAMADA MANUFACTURING CO., LTD., Kiryu (JP)

(72) Inventor: Akifumi Ozeki, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 316 days.

(21) Appl. No.: 16/492,696

(22) PCT Filed: Mar. 16, 2018

(86) PCT No.: PCT/JP2018/010615
§ 371 (c)(1),
(2) Date: Sep. 10, 2019

(87) PCT Pub. No.: WO2018/169081
PCT Pub. Date: Sep. 20, 2018

(65) Prior Publication Data
US 2020/0049263 A1    Feb. 13, 2020

(30) Foreign Application Priority Data

Mar. 17, 2017  (JP) .............................. JP2017-053702

(51) Int. Cl.
*F16K 5/04* (2006.01)
*F16K 11/076* (2006.01)
(Continued)

(52) U.S. Cl.
CPC .............. *F16K 11/076* (2013.01); *F16K 5/04* (2013.01); *F16K 5/0464* (2013.01); *F16K 5/181* (2013.01);
(Continued)

(58) Field of Classification Search
CPC ........ F16K 11/076; F16K 5/04; F16K 11/085; F16K 39/06; F16K 5/188; F16K 5/181;
(Continued)

(56) References Cited

U.S. PATENT DOCUMENTS 2,628,060 A * 2/1953 Parker .................. F16K 5/0414
251/174
3,794,291 A * 2/1974 Suyama ................ F16K 5/0673
251/171
(Continued)

FOREIGN PATENT DOCUMENTS

CN  200965075 Y  10/2007
CN  201802879 U   4/2011
(Continued)

OTHER PUBLICATIONS

International Search Report, dated Jun. 19, 2018 (Jun. 19, 2018), 2 pages.
(Continued)

*Primary Examiner* — Matthew W Jellett
*Assistant Examiner* — Christopher D Ballman
(74) *Attorney, Agent, or Firm* — Rankin, Hill & Clark LLP

(57) ABSTRACT

A control valve includes a valve housing, a joint member, a valve body, and a sealing tube member. The sealing tube member has a biasing pressure receiving surface that receives a pressure of a liquid inside the valve housing and biases the sealing tube member to the valve body side. An area S1 of the biasing pressure receiving surface and an area S2 of a valve sliding contact surface of the sealing tube member are set to satisfy Expressions (1) and (2), $$S1 < S2 \le S1/k \qquad (1)$$

$$\alpha \le k < 1 \qquad (2)$$

(Continued)

where k is a pressure reduction constant of a liquid flowing through a minute gap between the valve sliding contact surface and the valve body, and α is a lower limit value for the pressure reduction constant determined based on physical properties of a liquid.

8 Claims, 21 Drawing Sheets

(51) Int. Cl.
| | |
|---|---|
| *F16K 11/085* | (2006.01) |
| *F16K 39/06* | (2006.01) |
| *F16K 5/18* | (2006.01) |
| *F01P 3/20* | (2006.01) |
| *F01P 7/14* | (2006.01) |
| *F01P 7/16* | (2006.01) |

(52) U.S. Cl.
CPC ............ *F16K 5/188* (2013.01); *F16K 11/085* (2013.01); *F16K 11/0856* (2013.01); *F16K 39/06* (2013.01); *F01P 3/20* (2013.01); *F01P 7/165* (2013.01); *F01P 2007/146* (2013.01); *Y10T 137/3222* (2015.04); *Y10T 137/4463* (2015.04)

(58) Field of Classification Search
CPC ................ F16K 5/0464; F16K 11/0856; F01P 2007/146; F01P 7/165; F01P 3/20; Y10T 137/3222; Y10T 137/4463
See application file for complete search history.

(56) References Cited

U.S. PATENT DOCUMENTS

| | | | | |
|---|---|---|---|---|
| 3,848,849 A * | 11/1974 | Alexander | ............ | F16K 5/0464 251/314 |
| 4,477,055 A * | 10/1984 | Partridge | .............. | F16K 5/0673 137/328 |
| 6,340,029 B1 * | 1/2002 | Jun | .......................... | F16K 1/228 137/1 |
| 6,669,171 B1 * | 12/2003 | Stunkard | ............... | F16K 5/0642 251/315.08 |
| 7,255,130 B2 * | 8/2007 | Martins | .............. | B60H 1/00485 123/41.08 |
| 8,033,295 B2 * | 10/2011 | Meagher | .............. | F16K 11/0856 137/625.11 |
| 8,347,831 B2 * | 1/2013 | Vacca | ................... | F16K 11/085 123/41.08 |
| 8,490,945 B2 * | 7/2013 | Keeper | .................... | F16K 5/188 251/172 |
| 8,511,262 B2 * | 8/2013 | Komurian | ............... | F01P 7/167 123/41.4 |
| 8,733,733 B2 * | 5/2014 | Collison | ............... | F16K 5/0678 251/174 |
| 9,267,606 B2 * | 2/2016 | Haland | .................... | F16K 5/201 |
| 9,371,922 B2 * | 6/2016 | Marinzet | ............... | F16K 5/0407 |
| 9,567,892 B2 * | 2/2017 | Bilancia | .................... | F01P 1/06 |
| 9,617,906 B2 * | 4/2017 | Lee | ............. | F01P 7/14 |
| 10,704,453 B2 * | 7/2020 | Park | ...................... | F01M 5/002 |
| 2004/0154671 A1 | 8/2004 | Martins et al. | | |
| 2008/0179558 A1* | 7/2008 | Lloyd | ................... | F16K 5/0673 251/180 |
| 2010/0288955 A1 | 11/2010 | Bonanno | | |
| 2011/0147635 A1* | 6/2011 | Seveso | .................... | F16K 5/201 251/315.08 |
| 2014/0203203 A1* | 7/2014 | Scattini | .................... | F16K 5/201 251/317 |
| 2017/0335750 A1* | 11/2017 | Yumisashi | ................ | F16K 5/06 |

FOREIGN PATENT DOCUMENTS

| | | |
|---|---|---|
| CN | 102853151 A | 1/2013 |
| CN | 104747746 A | 7/2015 |
| EP | 2 213 850 A1 | 8/2010 |
| FR | 2827360 B1 | 10/2005 |
| JP | 2011-509369 A | 3/2011 |
| JP | 2015-218763 | 12/2015 |
| JP | 2016-196931 | 11/2016 |

OTHER PUBLICATIONS

Chinese Office Action with partial English translation dated May 27, 2020, 9 pages.

\* cited by examiner

CONTROL VALVE

TECHNICAL FIELD

The present invention relates to a control valve used for switching or the like of flow channels for vehicle cooling water.

Priority is claimed on Japanese Patent Application No. 2017-053702, filed Mar. 17, 2017, the content of which is incorporated herein by reference.

BACKGROUND ART

In cooling systems for cooling an engine using cooling water, in addition to a radiator flow channel for the cooling water circulating between a radiator and the engine, there are cases where a bypass flow channel, a warming-up flow channel, or the like is additionally installed. The bypass flow channel is a flow channel bypassing the radiator.

The warming up flow channel is a flow channel passing through an oil warmer. In a cooling system of this kind, a control valve is interposed in branching portions of the flow channels. In the cooling system, the flow channels are suitably switched using the control valves. A control valve in which a valve body having a cylinder wall is rotatably disposed inside a valve housing is known (for example, refer to Patent Literature 1). The control valve disclosed in Patent Literature 1 opens and closes an arbitrary flow channel in accordance with a rotation position of the valve body.

In the control valve disclosed in Patent Literature 1, an inflow port allowing a liquid such as cooling water to flow in and a set number of discharge ports for discharging a liquid that has flowed into the valve housing to the outside are provided in the valve housing. A plurality of valve holes through which the inside and the outside of the cylinder wall communicate with each other are formed in the cylinder wall of the valve body in a manner corresponding to the discharge ports. A joint member connecting a piping on the discharge side is joined to a circumferential edge of each of the discharge ports in the valve housing. First side end portions of sealing tube members are slidably held inside the valve housing of the joint member. A valve sliding contact surface is provided on a second side of each of the sealing tube members. The valve sliding contact surface of each of the sealing tube members comes into sliding contact with an outer surface of the cylinder wall at a position where at least a part of the valve body overlaps a rotation path of the corresponding valve hole.

The valve body allows an outflow of a liquid to the corresponding discharge port from an inner region of the cylinder wall when at a rotation position where the sealing tube member communicates with the corresponding valve hole. The valve body blocks an outflow of a liquid to the corresponding discharge port from the inner region of the cylinder wall when at a rotation position where the sealing tube member does not communicate with the corresponding valve hole. The rotation position of the valve body is controlled by an actuator (electric motor).

In the control valve disclosed in Patent Literature 1, the sealing tube member is biased toward the valve body by a biasing spring. Therefore, a pressure of a liquid inside the valve housing and a biasing force of the spring act on the sealing tube member.

Specifically, the sealing tube member is slidably mounted on an outer circumferential surface of a tube portion provided in a protruding manner at an inner end of the joint member. A gap between the outer circumferential surface of the tube portion and an inner circumferential surface of the sealing tube member is sealed by a seal ring. The biasing spring is interposed between an end surface on a side away from the valve body in the sealing tube member and the joint member. A region (spring supporting region and seal ring holding region) in the sealing tube member on the side away from the valve body constitutes a first acting surface where the liquid pressure inside the valve housing acts in a direction in which the sealing tube member is pressed to the valve body. A toric second acting surface where the liquid pressure inside the valve housing acts in a direction in which the sealing tube member separates from the valve body is provided in an outer circumferential edge portion on the valve sliding contact surface of the sealing tube member. The area of the first acting surface is set to be larger than the area of the second acting surface. A force corresponding to the area difference between the first acting surface and the second acting surface and the liquid pressure acts on the sealing tube member as a pressing force to the valve body.

CITATION LIST

Patent Literature

Patent Literature 1

Japanese Unexamined Patent Application, First Publication No. 2015-218763

SUMMARY OF INVENTION

Technical Problem

According to a control valve disclosed in Patent Literature 1, in addition to a biasing force of a spring, a biasing force generated due to a liquid pressure acts on a sealing tube member. Therefore, when an end portion of the sealing tube member is in a blocked state, the sealed state of the end portion of the sealing tube member can be favorably retained.

Here, the control valve disclosed in Patent Literature 1 is devised such that there is no leakage of a liquid between a valve sliding contact surface of the sealing tube member and a cylinder wall of a valve body. However, actually, there is a minute gap allowing sliding between the valve sliding contact surface and an outer surface of the cylinder wall, and a liquid pressure acting on a second acting surface adjacent to the valve sliding contact surface decreases due to liquid leakage through the gap. Therefore, the liquid pressure of the sealing tube member acting on the second acting surface becomes lower than the liquid pressure of the sealing tube member acting on a first acting surface. Accordingly, when the pressure of a liquid inside a valve housing (pressure difference between an upstream side and a downstream side of a discharge port) rises, the valve sliding contact surface of the sealing tube member is pressed to the valve body with an excessive force. Therefore, an increase in the size and output of an actuator rotatively driving the valve body cannot be avoided, and abrasion is likely to occur in the sealing tube member or a bearing portion of the valve body.

A problem to be solved is to provide a control valve in which a sealing tube member is prevented from pressing a valve body with an excessive force and favorable sealing properties between the sealing tube member and the valve body can be secured.

Solution to Problem

According to an aspect of the present application, a control valve is provided, including a valve housing which has an inflow port for causing a liquid to flow in from outside and a discharge port for discharging a liquid that has flowed in to the outside; a joint member which is joined to a circumferential edge of the discharge port; a valve body which is rotatably disposed inside the valve housing and has a circumferential wall portion in which a valve hole for communication between the inside and the outside is formed; and a sealing tube member in which one end side is held by the joint member in a state of communicating with the discharge port, and a valve sliding contact surface slidably abutting an outer surface of the circumferential wall portion at a position where at least a part of the valve body overlaps a rotation path of the valve hole is provided on the other end side. The valve body allows an outflow of a liquid to the discharge port from an inner region of the circumferential wall portion when at a rotation position where the valve hole and the sealing tube member are allowed to communicate with each other, and the valve body controls or blocks an outflow of a liquid to the discharge port from the inner region of the circumferential wall portion when at a rotation position where the valve hole and the sealing tube member are inhibited from communicating with each other. The sealing tube member has a biasing pressure receiving surface which receives a pressure of a liquid inside the valve housing and biases the sealing tube member to the valve body side. An area S1 of the biasing pressure receiving surface and an area S2 of the valve sliding contact surface of the sealing tube member are set to satisfy Expressions (1) and (2), $$S1 < S2 \leq S1/k \quad (1)$$

$$\alpha \leq k < 1 \quad (2)$$

here, k: a pressure reduction constant of a liquid flowing through a minute gap between the valve sliding contact surface and the valve body, and α: a lower limit value for the pressure reduction constant determined based on physical properties of a liquid.

According to the foregoing constitution, the area S1 of the biasing pressure receiving surface of the sealing tube member becomes an area with a value obtained by multiplying the area S2 of the valve sliding contact surface of the sealing tube member by the pressure reduction constant k, or greater. As a result, when the pressure of a liquid inside the valve housing acts on the biasing pressure receiving surface and a circumferential region portion on the valve sliding contact surface on the outer side, a pressing force in the direction of the valve body generated due to a liquid pressure acting on the sealing tube member through the biasing pressure receiving surface becomes a force equivalent to or greater than a lifting force from the valve body acting on the sealing tube member when a liquid leaks out through the minute gap between the valve sliding contact surface and the valve body. Therefore, the valve sliding contact surface of the sealing tube member can be maintained in a state of abutting the outer surface of the valve body.

In addition, since the area S1 of the biasing pressure receiving surface of the sealing tube member is smaller than the area S2 of the valve sliding contact surface, even if the pressure of a liquid inside the valve housing increases, the sealing tube member is prevented from being pressed to the valve body with an excessive force.

In addition, according to another aspect of the present application, a control valve is provided, including a valve housing which has an inflow port for causing a liquid to flow in from outside and a discharge port for discharging a liquid that has flowed in to the outside; a joint member which is joined to a circumferential edge of the inflow port, a valve body which is rotatably disposed inside the valve housing and has a circumferential wall portion in which a valve hole for communication between the inside and the outside is formed; and a sealing tube member in which one end side is held by the joint member in a state of communicating with the inflow port, and a valve sliding contact surface slidably abutting an outer surface of the circumferential wall portion at a position where at least a part of the valve body overlaps a rotation path of the valve hole is provided on the other end side. The valve body allows an inflow of a liquid to an inner region of the circumferential wall portion from an upstream portion of the inflow port when at a rotation position where the valve hole and the sealing tube member are allowed to communicate with each other, and the valve body controls or blocks an inflow of a liquid to the inner region of the circumferential wall portion from the upstream portion of the inflow port when at a rotation position where the valve hole and the sealing tube member are inhibited from communicating with each other. The sealing tube member has a biasing pressure receiving surface which receives a pressure of a liquid in the upstream portion of the inflow port and biases the sealing tube member to the valve body side. An area S1 of the biasing pressure receiving surface and an area S2 of the valve sliding contact surface of the sealing tube member are set to satisfy Expressions (1) and (2), $$S1 < S2 \leq S1/k \quad (1)$$

$$\alpha \leq k < 1 \quad (2)$$

here, k: a pressure reduction constant of a liquid flowing through a minute gap between the valve sliding contact surface and the valve body, and α: a lower limit value for the pressure reduction constant determined based on physical properties of a liquid.

According to the foregoing constitution, the area S1 of the biasing pressure receiving surface of the sealing tube member becomes an area of a value or greater obtained by multiplying the area S2 of the valve sliding contact surface of the sealing tube member by the pressure reduction constant k. As a result, when the pressure of a liquid from the upstream portion of the inflow port acts on the biasing pressure receiving surface and a circumferential region portion on the valve sliding contact surface on the inner side, a pressing force in the direction of the valve body generated due to a liquid pressure acting on the sealing tube member through the biasing pressure receiving surface becomes a force equivalent to or greater than a lifting force from the valve body acting on the sealing tube member when a liquid leaks out through the minute gap between the valve sliding contact surface and the valve body. Therefore, the valve sliding contact surface of the sealing tube member can be maintained in a state of abutting the outer surface of the valve body.

In addition, since the area S1 of the biasing pressure receiving surface of the sealing tube member is smaller than the area S2 of the valve sliding contact surface, even if the pressure of a liquid from the upstream portion of the inflow port increases, the sealing tube member is prevented from being pressed to the valve body with an excessive force. It is desirable that the valve sliding contact surface of the sealing tube member be constituted of an arc surface having a radius of the same curvature as a region on the outer surface of the circumferential wall portion abutting the sealing tube member.

In this case, since the entire region over the valve sliding contact surface substantially evenly abuts the outer surface of the circumferential wall portion, substantially even pressure reduction is likely to occur over the valve sliding contact surface from a radially outer end to an inner end. Accordingly, a lifting force acting on the valve sliding contact surface of the sealing tube member is stabilized, and the valve sliding contact surface can stably abut an outer circumferential surface of the valve body.

A displacement restriction spring restricting a displacement of the sealing tube member may be provided between the joint member and the sealing tube member.

In this case, even when a significant force in a direction in which the sealing tube member separates from the valve body acts on the sealing tube member, a displacement of the sealing tube member in the separation direction can be restricted by the displacement restriction spring. Accordingly, sealing performance of the sealing tube member is further stabilized.

Advantageous Effects of Invention

According to the control valve described above, the area of the valve sliding contact surface is set to be larger than the area of the biasing pressure receiving surface within a range in which a pressing force acting on the sealing tube member in the direction of the valve body due to a liquid does not fall below a lifting force acting on the sealing tube member. Therefore, the sealing tube member is prevented from pressing the valve body with an excessive force and favorable sealing properties can be secured.

DESCRIPTION OF EMBODIMENTS

Hereinafter, embodiments of the present invention will be described with reference to the drawings. In the following description, a case where a control valve according to the present embodiment is employed in a vehicle cooling system for cooling an engine using cooling water will be described.

Figure 1:
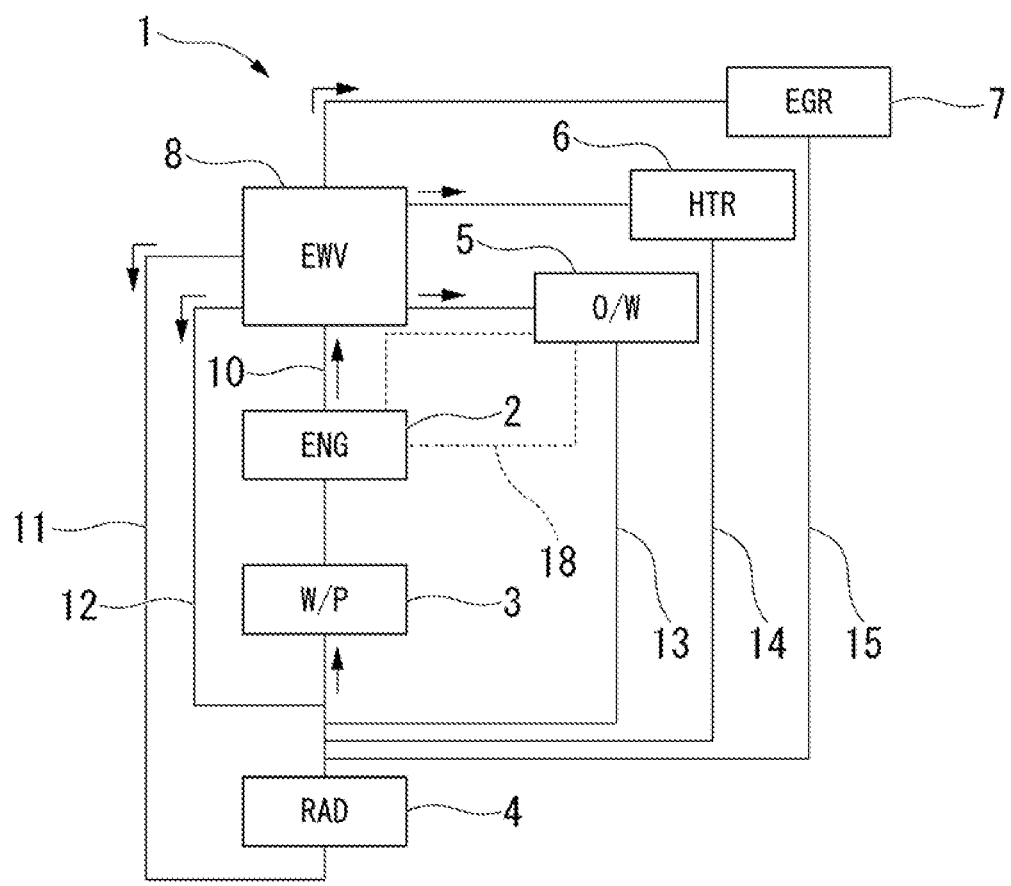
FIG. 1 is a block diagram of a cooling system according to a first embodiment.

FIG. 1 is a block diagram of a cooling system 1.

As illustrated in FIG. 1, the cooling system 1 is mounted as a vehicle driving source in vehicles equipped with at least an engine 2. Regarding vehicles, in addition to vehicles having only the engine 2, hybrid vehicles, plug-in hybrid vehicles, or the like may be adopted.

The cooling system 1 has a constitution in which the engine 2 (ENG), a water pump 3 (W/P), a radiator 4 (RAD), an oil warmer 5 (O/W), a heater core 6 (HTR), an EGR cooler 7 (EGR) and a control valve 8 (EWV) are connected through various kinds of flow channels 10 to 15.

An entrance side of a cooling path inside the engine 2 is connected to a discharge side of the water pump 3, and the control valve 8 is connected to an exit side of the cooling path therein. A flow channel connecting the water pump 3, the engine 2, and the control valve 8 sequentially from an upstream side to a downstream side constitutes the main flow channel 10 in the cooling system 1.

In the control valve 8, the main flow channel 10 branches into the radiator flow channel 11, the bypass flow channel 12, the warming-up flow channel 13, the air conditioning flow channel 14, and the EGR flow channel 15. Each of the downstream parts of the radiator flow channel 11, the bypass flow channel 12, the warming-up flow channel 13, the air conditioning flow channel 14, and the EGR flow channel 15 is connected to an intake side of the water pump 3.

The radiator 4 for performing heat exchange between the cooling water flowing in the flow channel and outside air is interposed in the radiator flow channel 11. The cooling water which has been cooled through the radiator 4 returns to the intake side of the water. pump 3.

The bypass flow channel 12 is a flow channel bypassing the radiator 4 when the temperature of the cooling water is low or the like. The cooling water returns to the intake side of the water pump 3 as it is.

The oil warmer 5 (heat exchanger for engine oil) is interposed in the warming-up flow channel 13. An oil path 18 in which the engine oil circulating inside the engine 2 flows is connected to the oil warmer 5. In the oil warmer 5, heat exchange is performed between the cooling water flowing in the warming-up flow channel 13 and the engine oil. In the present embodiment, from the viewpoint of improvement in fuel efficiency or early warming-up, "the oil warmer 5" is adopted as a heat exchanger. However, there are cases where the oil temperature of the engine oil becomes higher than the water temperature of the cooling water depending on driving conditions, and therefore it is natural that the heat exchanger be used as "an oil cooler" at that time.

The heater core 6 is interposed in the air conditioning flow channel 14. For example, the heater core 6 may be provided inside a duct (not illustrated) of an air conditioner. In the heater core 6, heat exchange is performed between the cooling water and air-conditioning air circulating inside the duct.

The EGR cooler 7 is interposed in the EGR flow channel 15. In the EGR cooler 7, heat exchange is performed between the cooling water flowing in the EGR flow channel 15 and an EGR gas.

In the cooling system 1 described above, the cooling water which has passed through the engine 2 in the main flow channel 10 flows into the control valve 8, and then the cooling water is selectively distributed to various flow channels 11 to 15 in accordance with an operation of the control valve 8. Accordingly, a prompt temperature rise, high-water temperature (optimum-temperature) control, and the like can be realized, so that improvement in fuel efficiency of the vehicle is achieved.

Figure 2:
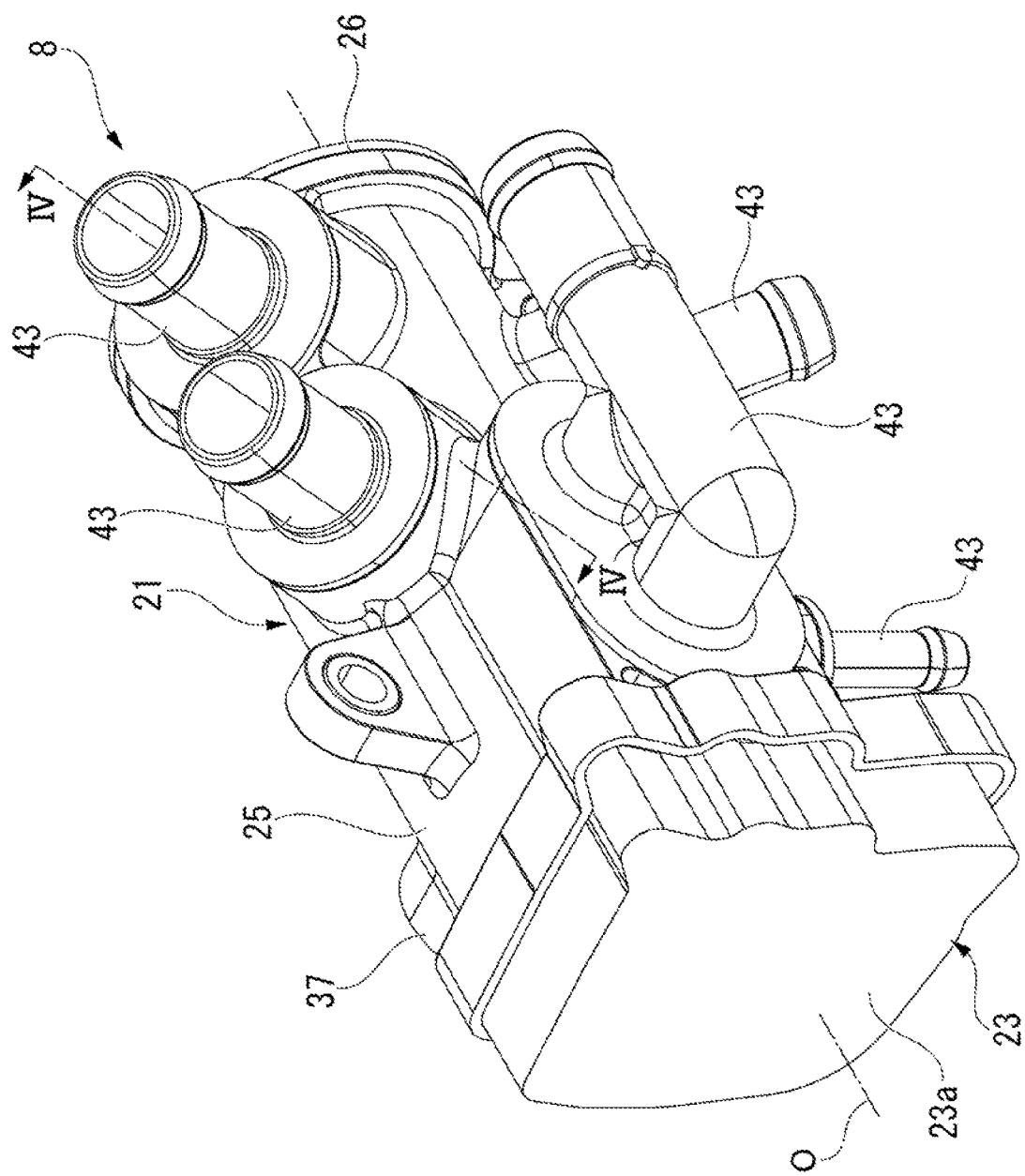
FIG. 2 is a perspective view of a control valve according to the first embodiment.
Figure 3:
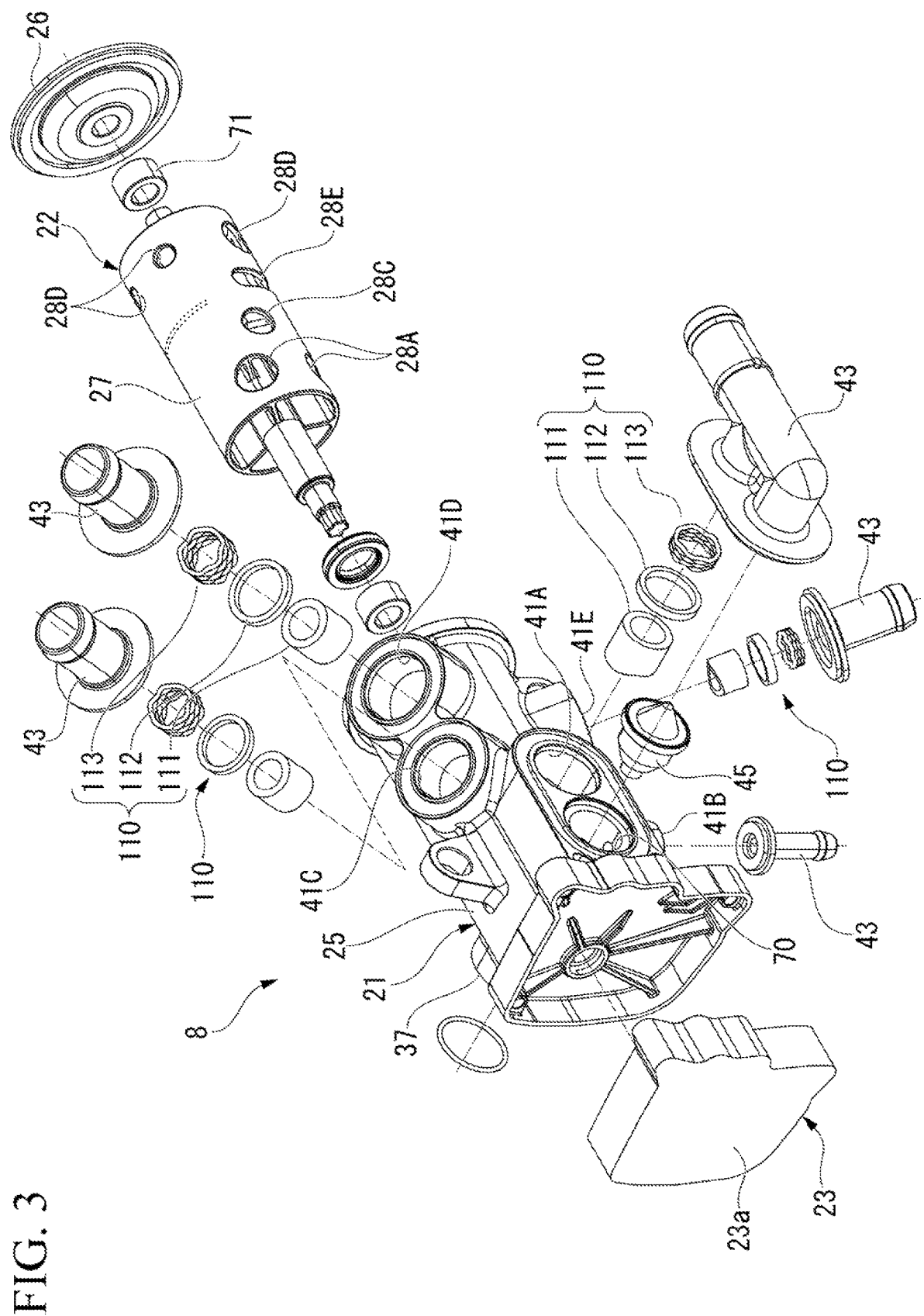
FIG. 3 is an exploded perspective view of the control valve according to the first embodiment.

FIG. 2 is a perspective view of the control valve 8 according to a first embodiment. FIG. 3 is an exploded perspective view of the same control valve 8.

As illustrated in FIGS. 2 and 3, the control valve 8 includes a valve housing 21 having an inflow port 37 and a plurality of discharge ports 41A, 41B, 41C, 41D, and 41E; a valve body 22 turnably disposed inside the valve housing 21; and a drive unit 23 rotatively driving the valve body 22.

The valve housing 21 has a bottomed tubular housing main body 25 internally accommodating the valve body 22 (having a valve accommodation portion), and a lid body 26 for closing an opening portion of the housing main body 25. In the following description, a direction along an axis O of the valve housing 21 will be simply referred to as an axial direction. The valve housing 21 is formed to have a tubular shape elongated in the axial direction. The inflow port 37 into which the cooling water (liquid) flows from outside (engine 2), and the plurality of discharge ports 41A, 41B, 41C, 41D, and 41E which are respectively connected to the radiator flow channel 11, the EGR flow channel 15, the bypass flow channel 12, the warming-up flow channel 13, and the air conditioning flow channel 14 illustrated in FIG. 1 and discharge the cooling water (liquid) which has flowed into the valve housing 21 to each of the flow channels are provided in a circumferential wall of the valve housing 21.

The inflow port 37 is provided in an outer circumference near one end side of the valve housing 21 in the axial direction, and the discharge ports 41A, 41B, 41C, 41D, and 41E are provided at suitable places separated from each other in the axial direction and a circumferential direction in the outer circumference of the housing main body 25. As illustrated in FIG. 3, each of the discharge ports 41A, 41B, 41C, 41D, and 41E is formed in an outer circumferential wall of the housing main body 25. A joint member 43 connecting a piping for discharging is joined to a circumferential edge of each of the discharge ports 41A, 41B, 41C, 41D, and 41E.

A sealing mechanism 110 including a sealing tube member 111 (which will be described below), a seal ring 112, and a displacement restriction spring 113 is provided inside each of the discharge ports 41A, 41C, 41D, and 41E except for the discharge port 41B connected to the EGR flow channel 15.

A fail opening 70 constituted to be able to be opened and closed by a thermostat 45 is formed in a part facing the inflow port 37 inside the valve housing 21. The discharge port 41B connected to the EGR flow channel 15 opens in a direction orthogonal to an opening direction of the fail opening 70. According to this constitution, the cooling water which has flowed into the valve housing 21 from the inflow port 37 touches the thermostat 45 and then flows into the EGR flow channel 15 through the discharge port 41B. Therefore, a flow toward the discharge port 41B can be made around the thermostat 45 inside the valve housing 21, and formation of still points around the thermostat 45 is curbed.

Regarding the discharge ports 41A, 41C, 41D, and 41E and the sealing mechanism 110 which is provided inside each thereof, although the sizes and the shapes are slightly different from each other, all have basic structures similar to each other. Therefore, hereinafter, the discharge port 41D connected to the warming-up flow channel 13 and the sealing mechanism 110 provided therein are taken as representatives thereof, and these and the valve body 22 will be described in detail with reference to FIGS. 3 and 4.

Figure 4:
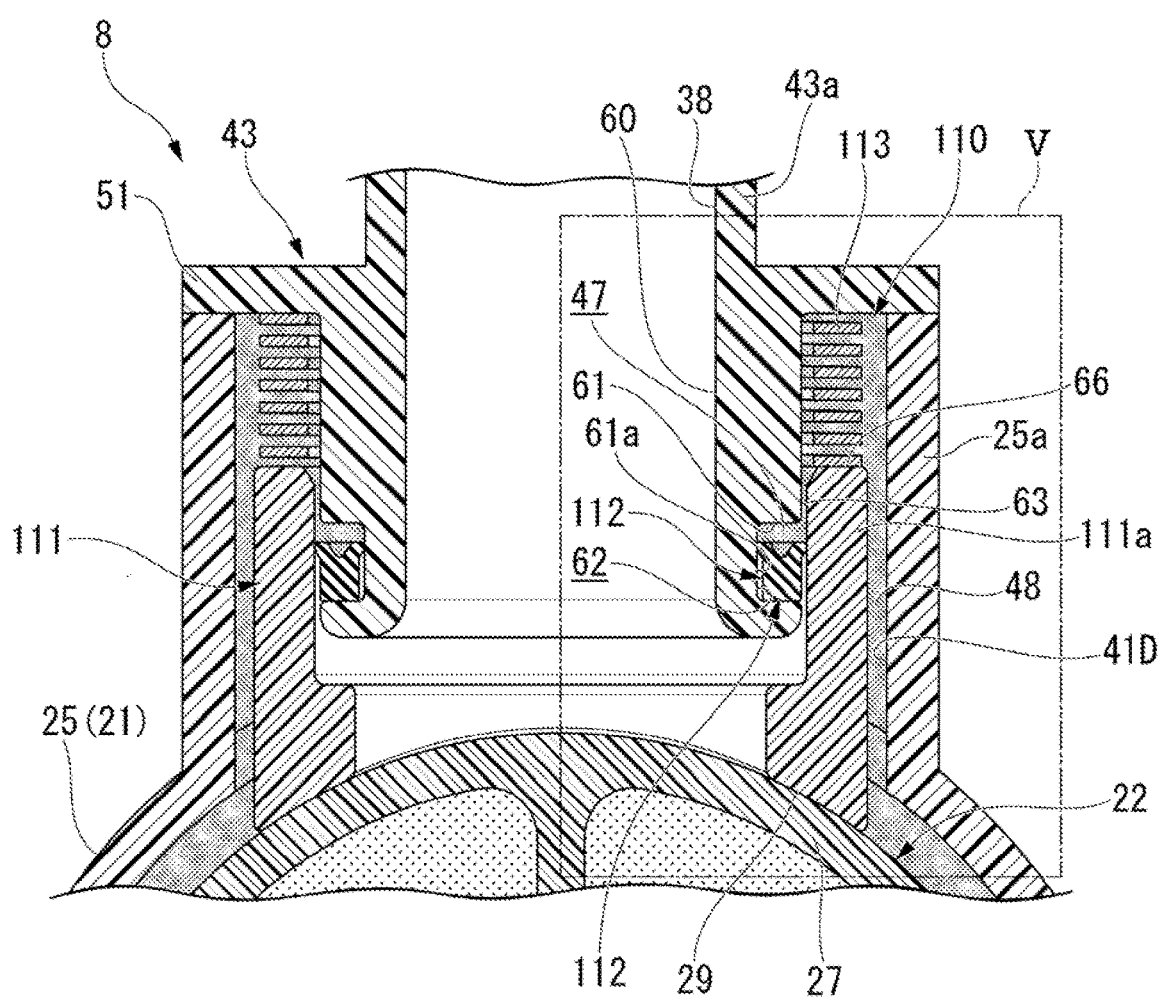
FIG. 4 is a cross-sectional view of the control valve according to the first embodiment along line IV-IV in FIG. 2.
Figure 5:
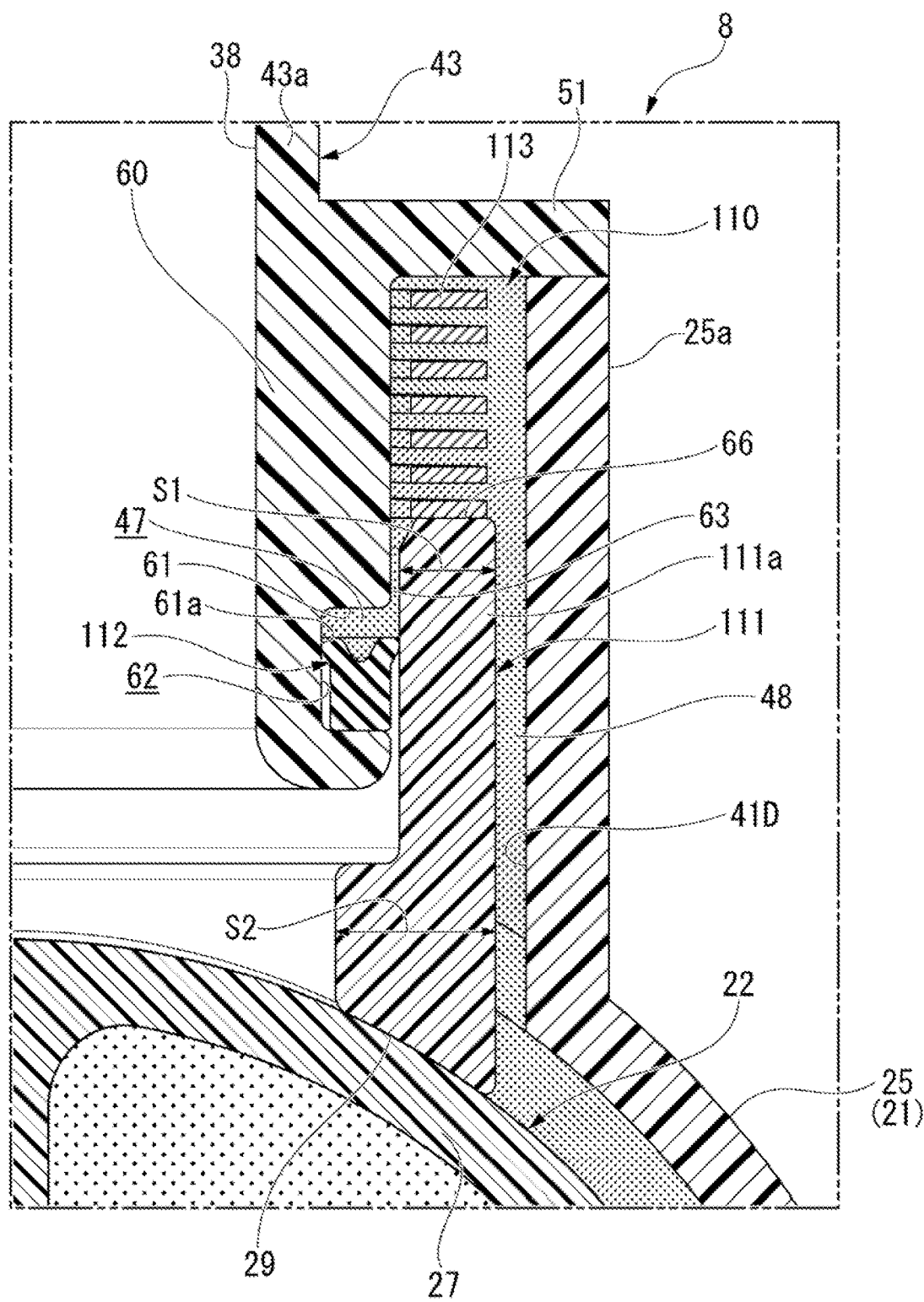
FIG. 5 is an enlarged view of a part V in FIG. 4 regarding the control valve according to the first embodiment.

FIG. 4 is a cross-sectional view of the control valve 8 along line IV-IV in FIG. 2, and FIG. 5 is an enlarged view illustrating a part V in FIG. 4.

As illustrated in FIG. 3, the valve body 22 is rotatably accommodated inside the valve housing 21. The valve body 22 includes a cylinder wall 27 disposed coaxially with the axis O of the valve housing 21. The cylinder wall 27 is the circumferential wall portion disclosed in the claims. A plurality of valve holes 28A, 28C, 28D, and 28E through which the inside and the outside of the cylinder wall 27 communicate with each other are formed at suitable places in the cylinder wall 27. The valve holes 28A, 28C, 28D, and 28E are provided in a manner corresponding to the discharge ports 41A, 41C, 41D, and 41E. The valve holes 28A, 28C, 28D, and 28E are provided to be separated from each other in the axial direction of the cylinder wall 27. Each of the discharge ports 41A, 41C, 41D, and 41E of the valve housing 21 is formed at a position where at least a part thereof overlaps a rotation path of each of the valve holes 28A, 28C, 28D, and 28E of the cylinder wall 27 in the direction of the axis O.

As illustrated in FIGS. 4 and 5, the sealing tube member 111 of the sealing mechanism 110 is formed to have substantially a cylindrical shape in its entirety. In the sealing tube member 111, an inner circumferential surface on one end side is slidably held by the joint member 43 of the corresponding discharge port 41D. In this state, the sealing tube member 111 communicates with a path hole 38 of the corresponding joint member 43. In addition, an arc-shaped valve sliding contact surface 29 is provided on an end surface of the sealing tube member 111 on the other end side. The valve sliding contact surface 29 slidably abuts an outer surface of the cylinder wall 27 at a position where at least a part of the valve body 22 overlaps the rotation path of the corresponding valve hole 28D. Both the sealing tube member 111 and the cylinder wall 27 of the valve body 22 are formed of a resin material.

The valve body 22 allows an outflow of the cooling water to the discharge port 41D from an inner region of the cylinder wall 27 via the sealing tube member 111 when at a rotation position where the valve hole 28D and the sealing tube member 111 corresponding to the valve hole 28D communicate with each other. In addition, the valve body 22 blocks an outflow of the cooling water to the discharge port 41D from the inner region of the cylinder wall 27 via the sealing tube member 111 when at a rotation position where the valve hole 28D and the sealing tube member 111 corresponding to the valve hole 28D do not communicate with each other.

The rotation position of the valve body 22 is suitably adjusted by the drive unit 23 provided in a bottom wall portion of the housing main body 25 (refer to FIGS. 2 and 3). The drive unit 23 is constituted such that a motor (not illustrated), a deceleration mechanism, a control board, and the like are stored inside a casing 23a.

As illustrated in FIGS. 4 and 5, the joint member 43 includes a joint main body portion 43a to which the piping for discharging is connected, a joint flange 51 projected radially outward from a base end of the joint main body portion 43a, and a tube portion 60 protruding from an inner circumferential edge portion of the joint flange 51 in an inward direction of the housing main body 25. The joint flange 51 is joined to an end surface of a circumferential wall 25a constituting the discharge port 41D of the housing main body 25 by suitable means such as welding or screwing. The tube portion 60 protrudes in a direction of the valve body 22 from a part of the discharge port 41D of the housing main body 25.

The sealing tube member 111 includes a cylindrical fitting wall 111a slidably fitted on an outer circumferential surface of the tube portion 60 of the joint member 43. The fitting wall 111a is disposed inside a space portion surrounded by the circumferential wall 25a of the valve housing 21 and the joint member 43. An end portion of the sealing tube member 111 on the valve body 22 side constitutes the valve sliding contact surface 29 which comes into sliding contact with the outer circumferential surface of the cylinder wall 27 of the valve body 22. A joint side end surface 66 on a side opposite to the valve sliding contact surface 29 of the sealing tube member 111 is a flat surface having a uniform width.

The displacement restriction spring 113 is interposed between the joint side end surface 66 of the sealing tube member 111 and the joint flange 51 of the joint member 43. The displacement restriction spring 113 restricts a displacement of the sealing tube member 111 in a direction of separation from the valve body 22. In the case of the present embodiment, the displacement restriction spring 113 functions to maintain the sealing tube member 111 at an initial position (position where the valve sliding contact surface 29 comes into contact with the outer circumferential surface of the valve body 22) in an assembled state. The displacement restriction spring 113 is set such that no significant biasing force acts on the sealing tube member 111 when the sealing tube member 111 is at the initial position.

An introduction path 48 is formed between the circumferential wall 25a of the valve housing 21 and the outer circumferential surface of the sealing tube member 111. The introduction path 48 causes the liquid pressure of the cooling water inside the valve housing 21 to act on the joint side end surface 66 of the sealing tube member 111. The joint side end surface 66 receives the liquid pressure of the cooling water inside the valve housing 21 in the direction of the valve body 22. In the present embodiment, the joint side end surface 66 constitutes a biasing pressure receiving surface.

In addition, a toric groove portion 61 is formed on the outer circumferential surface of the tube portion 60 of the joint member 43. A toric seal accommodation space 62 is provided between the groove portion 61 of the tube portion 60 and the inner circumferential surface of the sealing tube member 111. The seal ring 112 which comes into tight contact with a circumferential surface 61a of the groove portion 61 on a bottom portion side and the inner circumferential surface of the sealing tube member 111 is accommodated in the seal accommodation space 62.

The seal ring 112 is an annular elastic member having a Y-shaped cross section and is accommodated in the seal accommodation space 62 such that a Y-shaped opening side is directed to a side away from the valve body 22. In the seal ring 112, each of side end portions of a Y-shaped bifurcated portion comes into tight contact with the circumferential surface 61a of the groove portion 61 on the bottom portion side and the inner circumferential surface of the sealing tube member 111. A space between the seal ring 112 and the end surface of the groove portion 61 on the side away from the valve body 22 constitutes a liquid pressure chamber 47 into which the liquid pressure of the cooling water inside the valve housing 21 is introduced. In addition, an introduction path 63 is secured between the tube portion 60 of the joint member 43 and the fitting wall 111a of the sealing tube member 111. The introduction path 63 introduces the liquid pressure of the cooling water inside the valve housing 21 into the liquid pressure chamber 47 via the joint side end surface 66.

In addition, on the valve sliding contact surface 29 of the sealing tube member 111, the entire region over the sealing tube member 111 from the radially outer end to the inner end is formed to have a radius of the same curvature as a region on the outer surface of the cylinder wall 27 of the valve body 22 abutting the sealing tube member 111. Accordingly, the entire region over the sealing tube member 111 from the radially outer end to the inner end on the valve sliding contact surface 29 basically abuts the outer surface of the cylinder wall 27. However, due to manufacturing errors, assembly errors, or the like of the sealing tube member 111, a gap between a radially outer region on the valve sliding contact surface 29 and the cylinder wall 27 may be slightly larger.

Here, an area S1 of the joint side end surface 66 (biasing pressure receiving surface) in the sealing tube member 111 and an area S2 of the valve sliding contact surface 29 are set to satisfy the following Expressions (1) and (2).

$$S1<S2 \leq S1/k \quad (1)$$

$$\alpha \leq k < 1 \quad (2)$$

Here, k indicates a pressure reduction constant of a liquid flowing through a minute gap between the valve sliding contact surface and the valve body, and α indicates a lower limit value for the pressure reduction constant determined based on physical properties of a liquid.

The area S1 of the joint side end surface 66 and the area S2 of the valve sliding contact surface 29 mean areas when projected on a surface orthogonal to the axial direction of the sealing tube member 111.

The factor α in Expression (2) indicates a standard value of the pressure reduction constant determined based on the kind of a liquid, the usage environment (for example, the temperature), and the like, and $\alpha=\frac{1}{2}$ is established in a case of using water under an ordinary usage condition. When the physical properties of a liquid to be used change, the relationship is changed to $\alpha=\frac{1}{3}$ or the like.

In addition, the pressure reduction constant k in Expression (2) becomes α (for example, ½) which is the standard value of the pressure reduction constant when the valve sliding contact surface 29 evenly comes into contact with the cylinder wall 27 from the radially outer end to the inner end.

In addition, due to manufacturing errors or assembly errors of the sealing tube member 111, foreign substances, or the like, an abutting gap between the valve sliding contact surface 29 and the cylinder wall 27 may be no longer even over the valve sliding contact surface 29 from the radially outer end to the inner end, and the abutting gap of an outer end may increase. In this case, the pressure reduction constant k in Expression (2) is gradually approximated to $k=1$.

In the control valve 8 of the present embodiment, on the premise that there is a minute gap between the valve sliding contact surface 29 of the sealing tube member 111 and the cylinder wall 27 (valve body 22) in order to allow sliding between both thereof, the relationship between the areas S1 and S2 of the joint side end surface 66 and the valve sliding contact surface 29 is determined by Expressions (1) and (2).

That is, the pressure of the cooling water inside the valve housing 21 acts on the joint side end surface 66 of the sealing tube member 111 as it is. However, the pressure of the cooling water inside the valve housing 21 does not act on the valve sliding contact surface 29 as it is. The pressure acts thereon while being accompanied by pressure reduction when the cooling water flows from the radially outer end toward the inner end through the minute gap between the valve sliding contact surface 29 and the cylinder wall 27. At this time, the pressure of the cooling water inside the valve housing 21 flowing through the minute gap is gradually reduced toward the inside of the discharge port 41D under a low pressure, and the pressure tends to push up the sealing tube member 111 in the direction of separation from the valve body 22.

A force realized by multiplying the area S1 of the joint side end surface 66 by a pressure P inside the valve housing 21 acts on the joint side end surface 66 of the sealing tube member 111 as it is, and a force realized by multiplying the area S2 of the valve sliding contact surface 29 by the pressure P inside the valve housing 21 and the pressure reduction constant k acts on the valve sliding contact surface 29 of the sealing tube member 111.

In the control valve 8 of the present embodiment, as is clear from Expression (1), the areas S1 and S2 are set such that $k \times S2 \leq S1$ is established. Therefore, the relationship of $P \times k \times S2 \leq P \times S1$ is also established.

Accordingly, a force F1 ($F1=P \times S1$) acting on the joint side end surface 66 of the sealing tube member 111 in a pressing direction becomes equivalent to or greater than a force F2 ($F2=P \times k \times S2$) acting on the valve sliding contact surface 29 of the sealing tube member 111 in a lifting direction. Thus, in the control valve 8 of the present embodiment, the end portion of the sealing tube member 111 can be closed by the cylinder wall 27 of the valve body 22 based on only the relationship of the pressure of the cooling water inside the valve housing 21.

Meanwhile, in the control valve 8 of the present embodiment, as indicated in Expression (1), the area S1 of the joint side end surface 66 of the sealing tube member 111 is smaller than the area S2 of the valve sliding contact surface 29. Therefore, in the control valve 8, even if the pressure of the cooling water inside the valve housing 21 increases, the valve sliding contact surface 29 of the sealing tube member 111 can be prevented from being pressed to the cylinder wall 27 of the valve body 22 with an excessive force. Accordingly, when the control valve 8 is employed, an increase in the size and output of the drive unit 23 rotatively driving the valve body 22 can be avoided, and early abrasion in the sealing tube member 111 or a bearing portion 71 (refer to FIG. 3) of the valve body 22 can be curbed.

Here, using cooling water (k in Expression (2) has a relationship of $k=0.5$), a leakage test of cooling liquid and an abrasion test of the valve sliding contact surface 29 were performed with respect to the control valve 8 of the embodiment in which the area S1 of the joint side end surface 66 (biasing pressure receiving surface) and the area S2 of the valve sliding contact surface 29 satisfied Expression (1), and control valves of two comparative examples in which the areas S1 and S2 did not satisfy Expression (1). The following Table 1 and the graph in FIG. 6 show the results.

Figure 6:
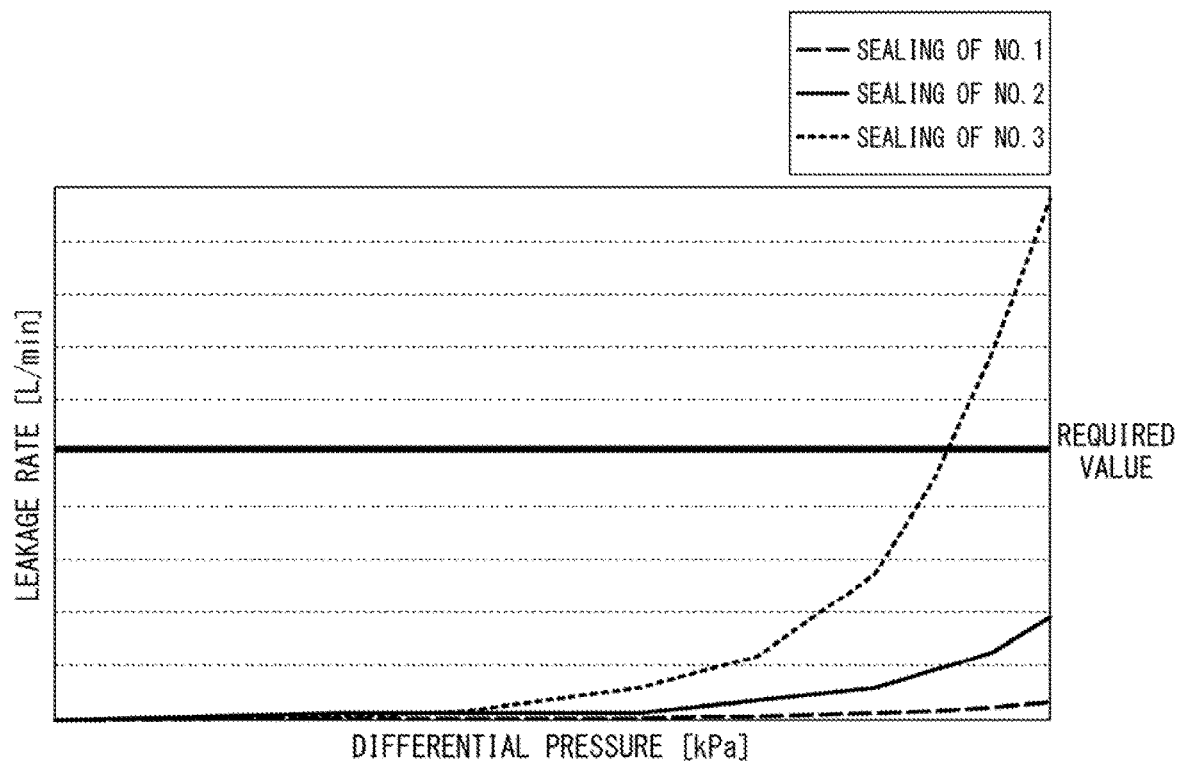
FIG. 6 is a graph showing test results of the control valve according to the embodiment and a control valve of a comparative example.

In Table 1 and FIG. 6, No. 2 indicates the control valve 8 of the embodiment satisfying Expression (1), and No. 1 indicates the control valve of the comparative example in which the areas S1 and S2 have relationships of S1>S2 and S2<S1/k. In addition, No. 3 indicates the control valve of the comparative example in which the areas S1 and S2 have relationships of S1<S2 and S2>S1/k.

TABLE 1

| No. | S1 [mm²] | S2 [mm²] | Region of S2 | Sealing properties | Sealing abrasion |
|---|---|---|---|---|---|
| 1 | 207.3 | 165.9 | Beyond the range of Expression Smaller than S1 | Fair | Considerable |
| 2 | 207.3 | 311.0 | Within the range of Expression | Fair | Little |
| 3 | 207.3 | 472.7 | Beyond the range of Expression Larger than S1/k | Poor | Little |

*Tested by water. The pressure reduction constant k is set to 0.5.

In the leakage test of cooling liquid, the rotation position of the valve body 22 of the control valve 8 was set to a position where the valve hole 28D of the valve body 22 and the sealing tube member 111 corresponding to the valve hole 28D did not communicate with each other. In this state, the leakage rate of the cooling liquid from the discharge port when the pressure at the inflow port was gradually increased was measured. In addition, in the abrasion test of the valve sliding contact surface 29, the abrasion state of the valve sliding contact surface 29 when the pressure at the inflow port was uniform and the cylinder wall 27 of the valve body 22 was rotated for a predetermined time was judged.

As is clear from Table 1 and FIG. 6, in the comparative example of No. 1 in which the area S2 of the valve sliding contact surface 29 was smaller than the area S1 of the joint side end surface (biasing pressure receiving surface) 66 (S1>S2), the leakage rate of the cooling water was low. However, in the comparative example of No. 1, abrasion on the valve sliding contact surface 29 was greater than that in the control valves of No. 1 and No. 3. In addition, in the comparative example of No. 3 in which the area S2 of the valve sliding contact surface 29 was larger than S1/k, there was little abrasion on the valve sliding contact surface 29. However, in the comparative example of No. 3, the leakage rate of the cooling water was higher than a required value.

In contrast, in the control valve 8 of the embodiment, that is, No. 2 in which the areas S1 and S2 satisfied Expression (1), there was little abrasion on the valve sliding contact surface 29, and there was little leakage of the cooling water within the required value.

When the control valve 8 according to the present embodiment is employed, the sealing tube member 111 is prevented from pressing the cylinder wall 27 of the valve body 22 with an excessive force, and the end portion of the sealing tube member 111 can be appropriately opened and closed by the cylinder wall 27 of the valve body 22.

In addition, in the control valve 8 of the present embodiment, the valve sliding contact surface 29 of the sealing tube member 111 is constituted of an arc surface having a radius of the same curvature as a region on the outer surface of the cylinder wall 27 of the valve body 22 abutting the sealing tube member 111. Therefore, the entire region over the valve sliding contact surface 29 easily and evenly abuts the outer surface of the cylinder wall 27, and substantially even pressure reduction is likely to occur over the valve sliding contact surface 29 from the radially outer end to the inner end. Accordingly, when the control valve 8 of the present embodiment is employed, a lifting force acting on the valve sliding contact surface 29 of the sealing tube member 111 is stabilized, and sealing performance of the sealing tube member 111 with respect to the valve body 22 is stabilized.

Moreover, in the control valve 8 of the present embodiment, the displacement restriction spring 113 for restricting a displacement of the sealing tube member 111 in a direction of separation from the outer surface of the cylinder wall 27 of the valve body 22 is provided between the joint member 43 and the sealing tube member 111. Therefore, even when a significant force acts on the sealing tube member 111 in the lifting direction for some reason or when the pressure inside the valve housing 21 is low, an excessive displacement of the sealing tube member 111 can be restricted by the displacement restriction spring 113. Accordingly, when this constitution is employed, it is difficult for the sealing tube member 111 to be lifted from the outer surface of the cylinder wall 27, and therefore sealing performance of the sealing tube member 111 is stabilized.

In the control valve 8 of the present embodiment, the annular groove portion 61 is provided on the outer circumferential surface of the tube portion 60 provided in the joint member 43 in a protruding manner, and the toric seal accommodation space 62 is provided between the groove portion 61 of the tube portion 60 and the inner circumferential surface of the sealing tube member 111. Thus, the seal ring 112 which comes into tight contact with a circumferential surface of the groove portion 61 and the inner circumferential surface of the sealing tube member 111 is accommodated in the seal accommodation space 62. A space between the seal ring 112 and a surface of the groove portion 61 on the side away from the valve body 22 inside the seal accommodation space 62 constitutes the liquid pressure chamber 47 into which the liquid pressure inside the valve housing 21 is introduced. In addition, the joint side end surface 66 of the sealing tube member 111 constitutes a biasing pressure receiving surface.

Therefore, a pressurizing force generated due to the liquid pressure inside the valve housing 21 acting on the seal ring 112 acts in the direction of the valve body 22. However, this pressurizing force is received by the groove portion 61 of the joint member 43. Accordingly, a pressurizing force generated due to the liquid pressure via the seal ring 112 is not applied to the sealing tube member 111. Thus, in the control valve 8 of the present embodiment, since a pressure receiving surface of the seal ring 112 does not function as the biasing pressure receiving surface, a pressing force acting on the sealing tube member 111 in the direction of the valve body 22 can be stabilized at all times. That is, even if a displacement of the seal ring 112 is hindered for some reason, a pressurizing force in the direction of the valve body 22 acting on the sealing tube member 111 can be maintained.

In addition, in the control valve 8 of the present embodiment, when the seal ring 112 contracts by receiving the pressure inside the liquid pressure chamber 47, a minute pulling force accompanying the contraction thereof acts on the inner circumferential surface of the sealing tube member 111. However, a pulling direction thereof acts in the direction of the valve body 22. Accordingly, in the control valve 8 of the present embodiment, a pulling force accompanying the contraction of the seal ring 112 is not applied as a force causing the sealing tube member 111 to be away from the valve body 22, and leakage of the cooling water from the valve sliding contact surface 29 of the sealing tube member 111 can be curbed to that extent.

Subsequently, a second embodiment illustrated in FIGS. 7 and 8 will be described. In the following description including description of modification examples (which will be described below), the same reference signs are applied to parts in common with the first embodiment, and duplicate description will be omitted.

Figure 7:
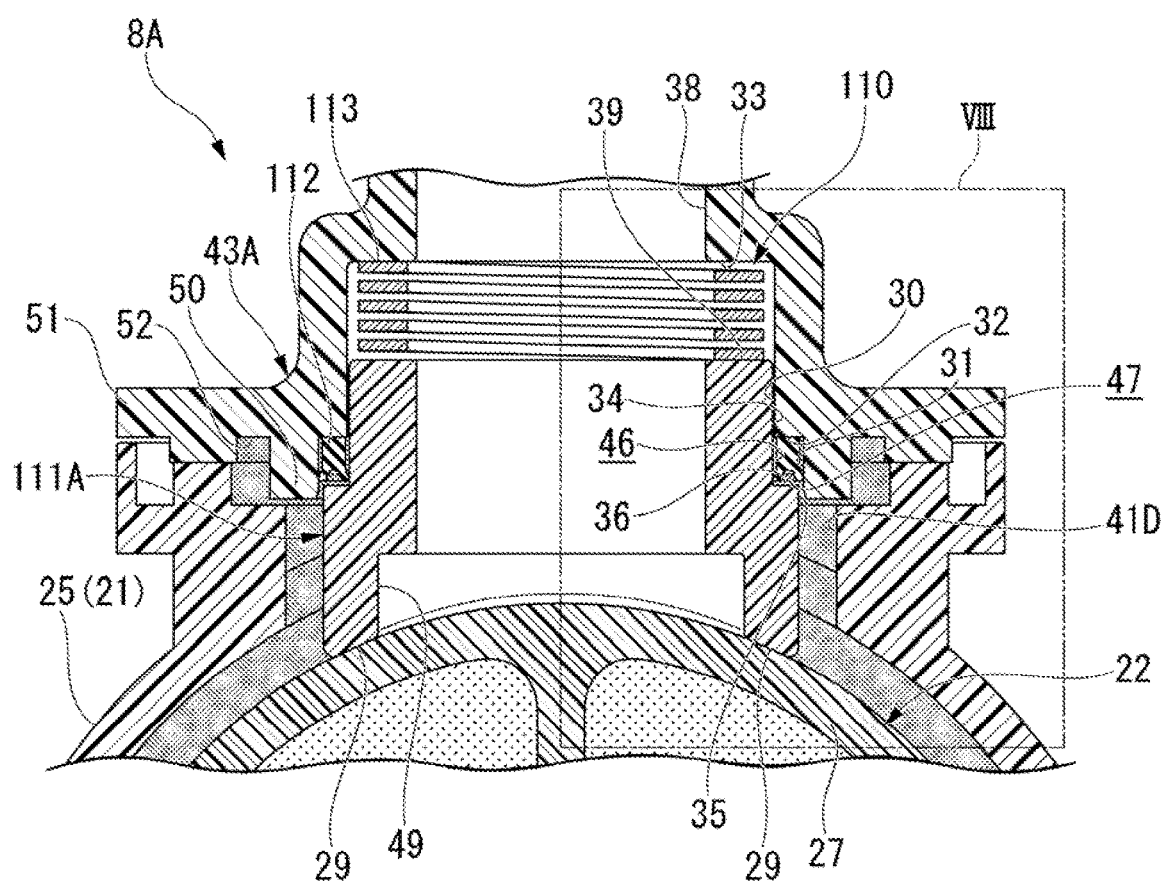
FIG. 7 is a cross-sectional view corresponding to a cross section along line IV-IV in FIG. 2 regarding a control valve according to a second embodiment.
Figure 8:
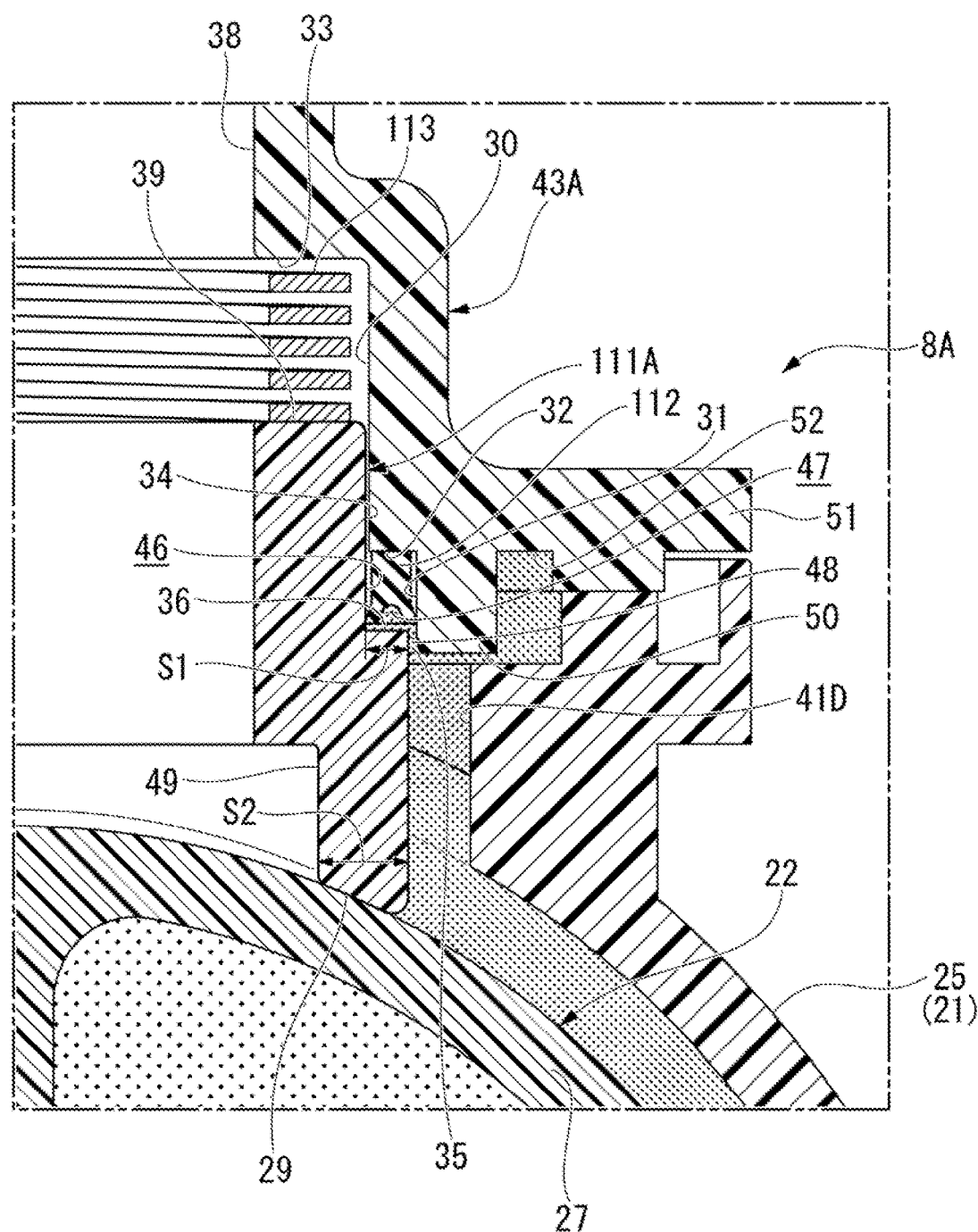
FIG. 8 is an enlarged view of a part VIII in FIG. 7 regarding the control valve according to the second embodiment.

FIG. 7 is a cross-sectional view similar to that in FIG. 4 of the first embodiment regarding a control valve 8A of the second embodiment. FIG. 8 is an enlarged view illustrating a part VIII in FIG. 7.

A joint member 43A includes a small diameter inner circumferential surface 30 slidably holding an outer circumferential surface in a region of a sealing tube member 111A on the side away from the valve body 22, and a large diameter inner circumferential surface 31 formed to be increased in diameter in a stepped state from an end portion on the small diameter inner circumferential surface 30 on a side approaching the valve body 22. The small diameter inner circumferential surface 30 and the large diameter inner circumferential surface 31 are connected to each other through a flat toric first stepped surface 32 (stepped surface) extending in a direction orthogonal to these. In addition, in the end portion on the small diameter inner circumferential surface 30 of the joint member 43A on the side away from the valve body 22, a flat tonic second stepped surface 33 which is bent in a diameter reducing direction in a stepped state and connects the small diameter inner circumferential surface 30 and the path hole 38 to each other is continuously provided.

In addition, on a side radially outward with respect to a circumferential wall 50 constituting the large diameter inner circumferential surface 31 of the joint member 43A, the joint flange 51 to be joined to the housing main body 25 is formed to project radially outward.

A burr accommodation portion 52 is provided between the circumferential wall 50 of the joint member 43A and the joint flange 51. The burr accommodation portion 52 accommodates burrs generated when the joint flange 51 is joined to the housing main body 25 through vibration welding or the like. The burr accommodation portion 52 is constituted of recessed portions formed on surfaces of the joint flange 51 and the housing main body 25 facing each other. The circumferential wall 50 constituting the large diameter inner circumferential surface 31 also serves as a burr restriction wall restricting an outflow of burrs from the burr accommodation portion 52 to the inside of the valve housing 21.

The sealing tube member 111A includes a small diameter outer circumferential surface 34 slidably fitted inward on the small diameter inner circumferential surface 30 of the joint member 43A, and a large diameter outer circumferential surface 35 formed to be increased in diameter in a stepped state from an end portion on the small diameter outer circumferential surface 34 on the side approaching the valve body 22. The small diameter outer circumferential surface 34 and the large diameter outer circumferential surface 35 are connected to each other through a toric connection surface 36 extending in a direction orthogonal to these. In addition, in the end portion on the small diameter outer circumferential surface 34 of the sealing tube member 111A on the side away from the valve body 22, a flat torte support surface 39 which is bent in the diameter reducing direction substantially at a right angle is continuously provided.

In addition, at an end edge on the inner circumferential surface of the sealing tube member 111A on the side approaching the valve body 22, a toric thinned portion 49 is provided to be increased in diameter in a stepped state.

A toric seal accommodation space 46 surrounded by the large diameter inner circumferential surface 31 and the small diameter outer circumferential surface 34 is provided between the first stepped surface 32 of the joint member 43A and the connection surface 36 of the sealing tube member 111A. The seal ring 112 is accommodated in this seal accommodation space 46.

The seal ring 112 is an annular elastic member having a Y-shaped cross section and is accommodated in the seal accommodation space 46 such that the Y-shaped opening side is directed to the connection surface 36 side. In the seal ring 112, each of the side end portions of the Y-shaped bifurcated portion comes into tight contact with the large diameter inner circumferential surface 31 and the small diameter outer circumferential surface 34. A space between the seal ring 112 and the connection surface 36 of the sealing tube member 111A constitutes the liquid pressure chamber 47 into which the liquid pressure of the cooling water inside the valve housing 21 is introduced. In addition, the introduction path 48 is provided between the large diameter inner circumferential surface 31 of the joint member 43A and the large diameter outer circumferential surface 35 of the sealing tube member 111A. The introduction path 48 introduces the liquid pressure of the cooling water inside the valve housing 21 into the liquid pressure chamber 47.

It is preferable that a gap be formed between the connection surface 36 of the sealing tube member 111A and the seal ring 112. For example, when the sealing tube member 111A slides on the small diameter inner circumferential surface 30 of the joint member 43A due to a foreign substance, the sealing tube member 111A is prevented from pressing the seal ring 112 due to the presence of the gap, and therefore sealing properties of the seal ring 112 are retained. In addition, since each of the side end portions of the bifurcated portion of the seal ring 112 comes into tight contact with the large diameter inner circumferential surface 31 and the small diameter outer circumferential surface 34, the liquid pressure of the cooling water inside the valve housing 21 does not act on the support surface 39.

The liquid pressure of the cooling water inside the valve housing 21 acts on the connection surface 36 of the sealing tube member 111A. The connection surface 36 is directed in a direction opposite to the valve sliding contact surface 29 on the sealing tube member 111A and is pressurized in the direction of the valve body 22 by receiving the liquid pressure of the cooling water inside the valve housing 21. In the present embodiment, the connection surface 36 constitutes a biasing pressure receiving surface in the sealing tube member 111A.

In addition, the displacement restriction spring 113 for restricting a displacement of the sealing tube member 111A in the direction of separation from the valve body 22 is interposed between the second stepped surface 33 of the joint member 43A and the support surface 39 of the sealing tube member 111A. In the case of the present embodiment, the displacement restriction spring 113 functions to maintain the sealing tube member 111A at an initial position (position where the valve sliding contact surface 29 comes into contact with the outer circumferential surface of the valve body 22) in an assembled state, and the displacement restriction spring 113 is set such that no significant biasing force to the sealing tube member 111A acts when the sealing tube member 111A is at the initial position.

In addition, on the valve sliding contact surface 29 of the sealing tube member 111A, the entire region over the sealing tube member 111A from the radially outer end to the inner end is formed to have a radius of the same curvature as a region on the outer surface of the cylinder wall 27 of the valve body 22 abutting the sealing tube member 111A. Accordingly, the entire region over the sealing tube member 111A from the radially outer end to the inner end on the valve sliding contact surface 29 basically abuts the outer surface of the cylinder wall 27.

In the present embodiment, an area S1 of the connection surface 36 (biasing pressure receiving surface) in the sealing tube member 111A and the area S2 of the valve sliding contact surface 29 are set to satisfy Expressions (1) and (2) described in the first embodiment.

As described above, in the control valve 8A of the present embodiment, similar to the first embodiment, the area S2 of the valve sliding contact surface 29 is set to be larger than the area S1 of the connection surface 36 (biasing pressure receiving surface) within a range in which a pressing force in the direction of the valve body 22 generated due to the liquid pressure acting on the sealing tube member 111A does not fall below a lifting force acting on the sealing tube member 111A. Therefore, in the control valve 8A of the present embodiment, the sealing tube member 111A is prevented from pressing the cylinder wall 27 of the valve body 22 with an excessive force, and the end portion of the sealing tube member 111A can be appropriately opened and closed by the cylinder wall 27 of the valve body 22. The control valve 8A of the present embodiment can achieve basic effects substantially similar to those in the first embodiment.

In addition, in the case of the control valve 8A of the present embodiment, the displacement restriction spring 113 biases a position of the sealing tube member 111A where the valve sliding contact surface 29 of the sealing tube member 111A is deviated radially inward at all times. Accordingly, even when abrasion on the valve sliding contact surface 29 proceeds from a side radially outward by being used over time, a radially inner region on the valve sliding contact surface 29 can be reliably brought into press contact with the outer surface of the cylinder wall 27 due to a pressing load of the displacement restriction spring 113. Thus, when the control valve 8A of the present embodiment is employed, sealing performance of the valve sliding contact surface 29 of the sealing tube member 111A can be highly maintained over a long period of time.

Figure 9:
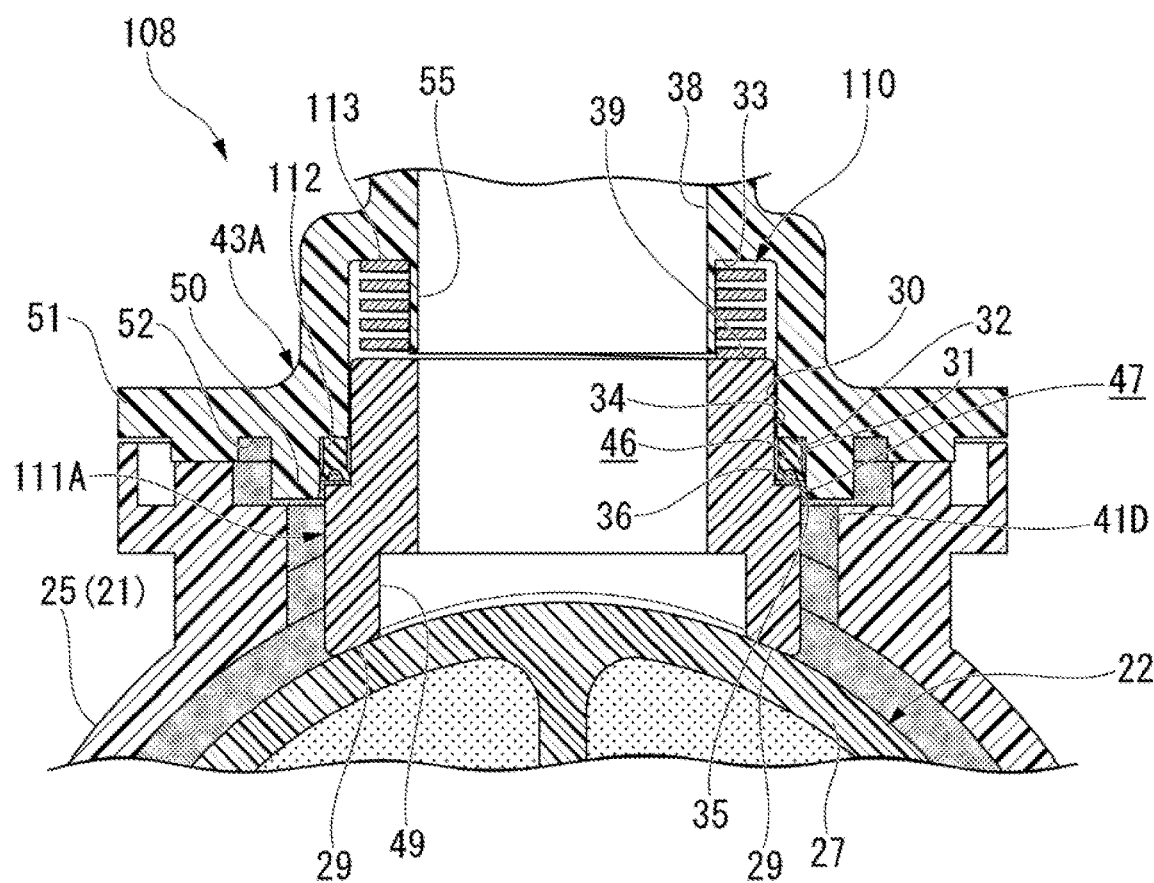
FIG. 9 is a cross-sectional view similar to that in FIG. 7 regarding a control valve according to a third embodiment.

FIG. 9 is a cross-sectional view similar to that in FIG. 7 of the second embodiment regarding a control valve 108 according to a third embodiment.

The basic constitution of the control valve 108 of the third embodiment is substantially similar to the constitution of that in the second embodiment.

In the control valve 108, a restriction tube 55 extending in the direction of the valve body 22 and restricting a displacement of the displacement restriction spring 113 to a side radially inward is provided in an extending manner in a radially inner edge portion of the second stepped surface 33 of the joint member 43A. The constitution is otherwise similar to that in the second embodiment.

The control valve 108 of the present embodiment can achieve basic effects similar to those in the second embodiment. Moreover, in the control valve 108 of the present embodiment, since the restriction tube 55 is provided in an extending manner in the radially inner edge portion of the second stepped surface 33 of the joint member 43A, a displacement of the displacement restriction spring 113 to a side radially inward can be restricted by the restriction tube 55, and the occurrence of turbulence in a flow of the cooling water from the inside of the sealing tube member 111A toward the path hole 38 can be curbed by the restriction tube 55.

Figure 21:
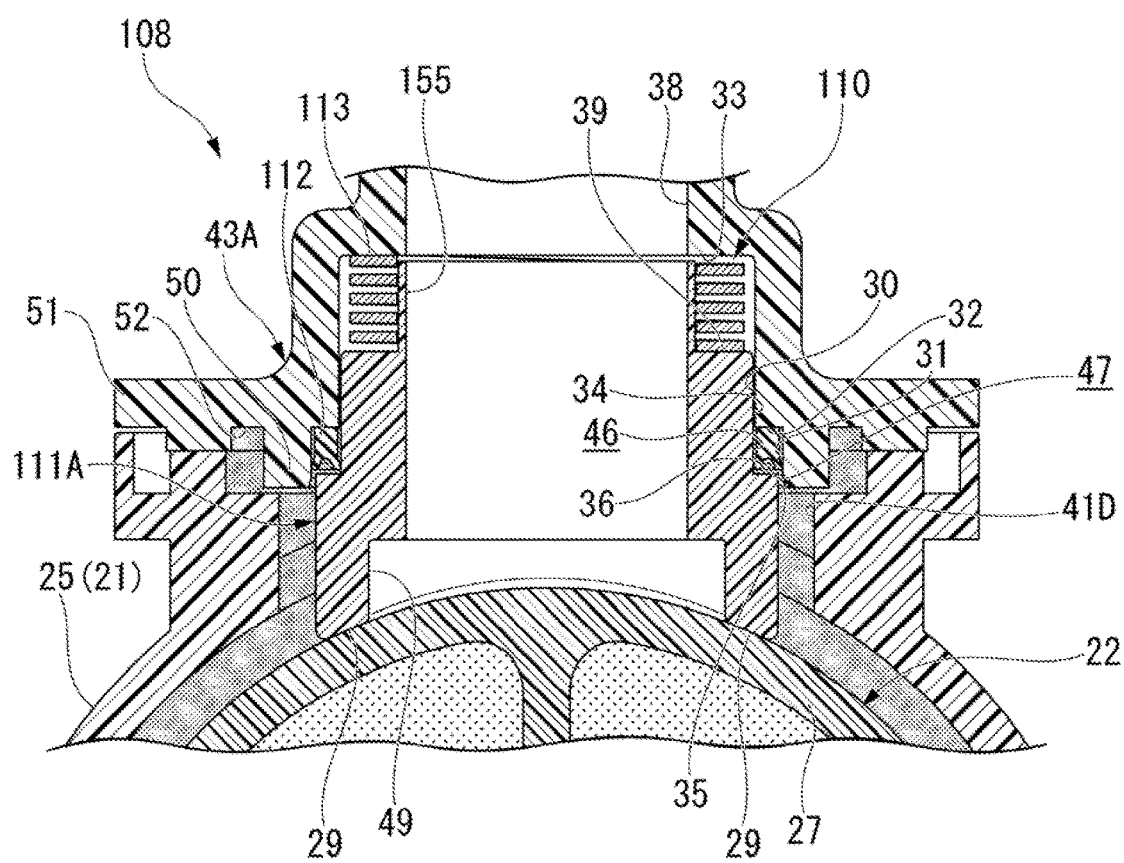
FIG. 21 is a cross-sectional view similar to that in FIG. 7 and illustrates a modification example of the control valve of the third embodiment.

In the present embodiment, the restriction tube 55 is provided in the joint member 43A. However, as illustrated in FIG. 21, a restriction tube 155 extending in an inner circumferential direction of the displacement restriction spring 113 may be provided in the inner circumferential edge portion of the sealing tube member 111A.

In addition, FIGS. 10 to 13 are cross-sectional views similar to that in FIG. 7 illustrating modification examples of the foregoing embodiment.

Figure 10:
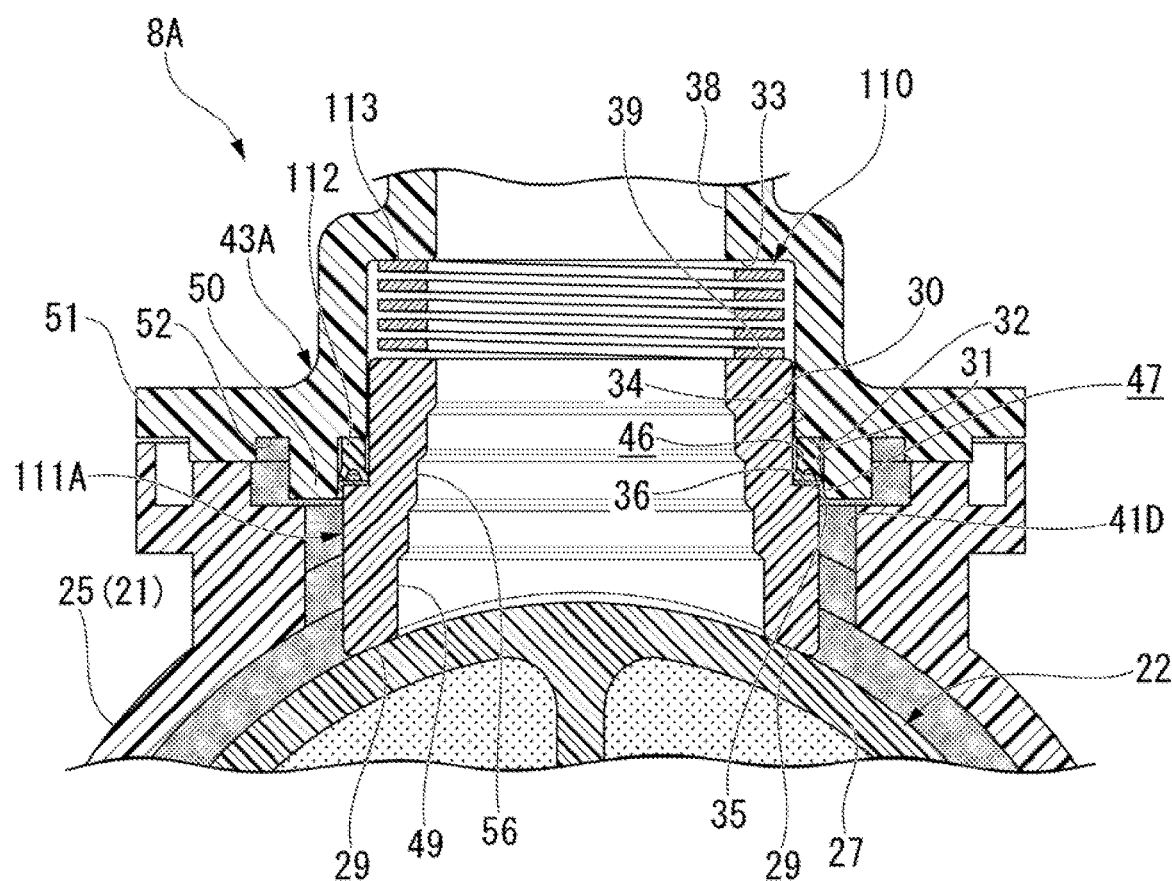
FIG. 10 is a cross-sectional view similar to that in FIG. 7 regarding a first modification example of the control valve according to the embodiment.

In the modification example illustrated in FIG. 10, a stepped diameter decreasing portion 56 gently decreased in diameter in a stepped shape from the thinned portion 49 toward the side away from the valve body 22 is formed on the inner circumferential surface of the sealing tube member 111A. In the case of this modification example, since the inner circumferential surface of the sealing tube member 111A is decreased in diameter in a stepped shape from the thinned portion 49 toward a side separated from the valve body 22, when the cooling water flows into the sealing tube member 111A from the valve body 22, the occurrence of turbulence in a part of the thinned portion 49 can be curbed.

Figure 11:
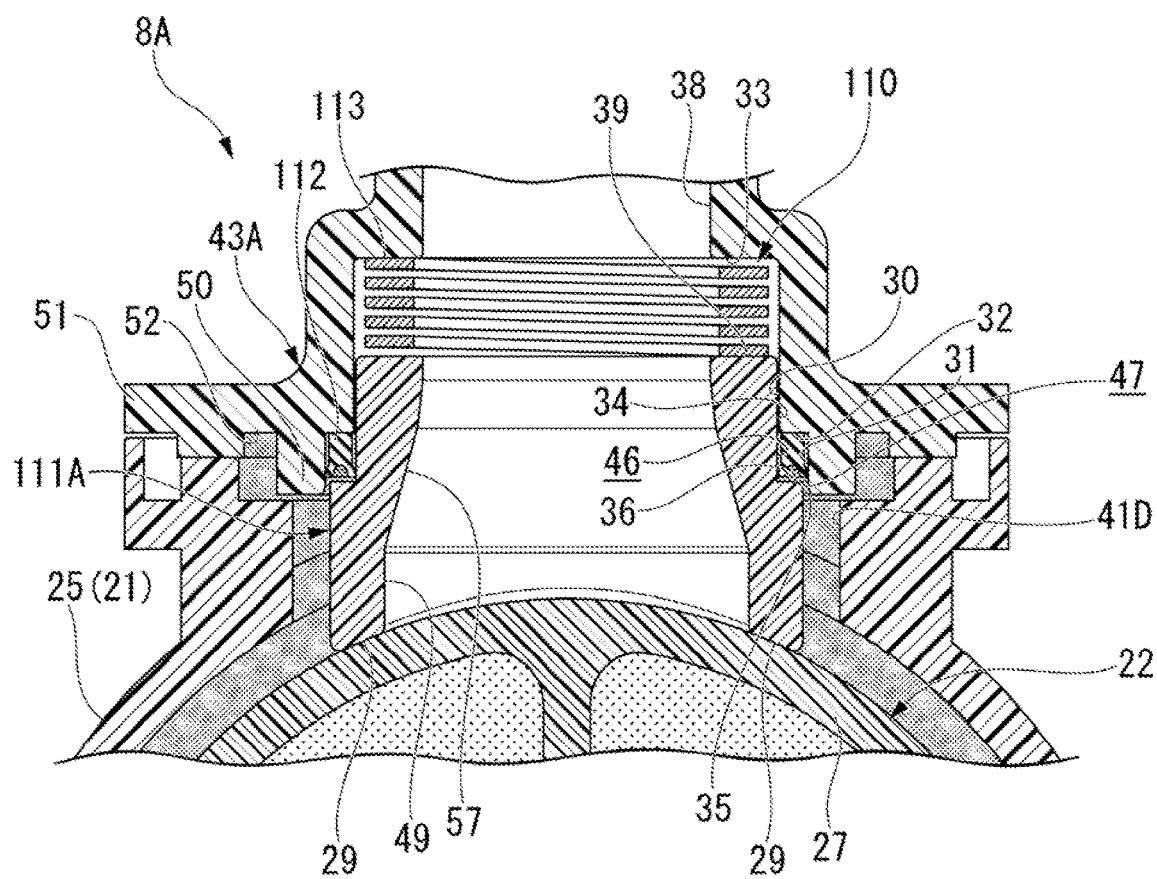
FIG. 11 is a cross-sectional view similar to that in FIG. 7 regarding a second modification example of the control valve according to the embodiment.

In the modification example illustrated in FIG. 11, a tapered diameter decreasing portion 57 continuously decreased in diameter in a tapered shape from the thinned portion 49 toward the side away from the valve body 22 is formed on the inner circumferential surface of the sealing tube member 111A. In the case of this modification example, since the inner circumferential surface of the sealing tube member 111A is continuously decreased in diameter from the thinned portion 49 toward the side separated from the valve body 22, when the cooling water flows into the sealing tube member 111A from the valve body 22, the occurrence of turbulence in a part of the thinned portion 49 can be more effectively curbed.

Figure 12:
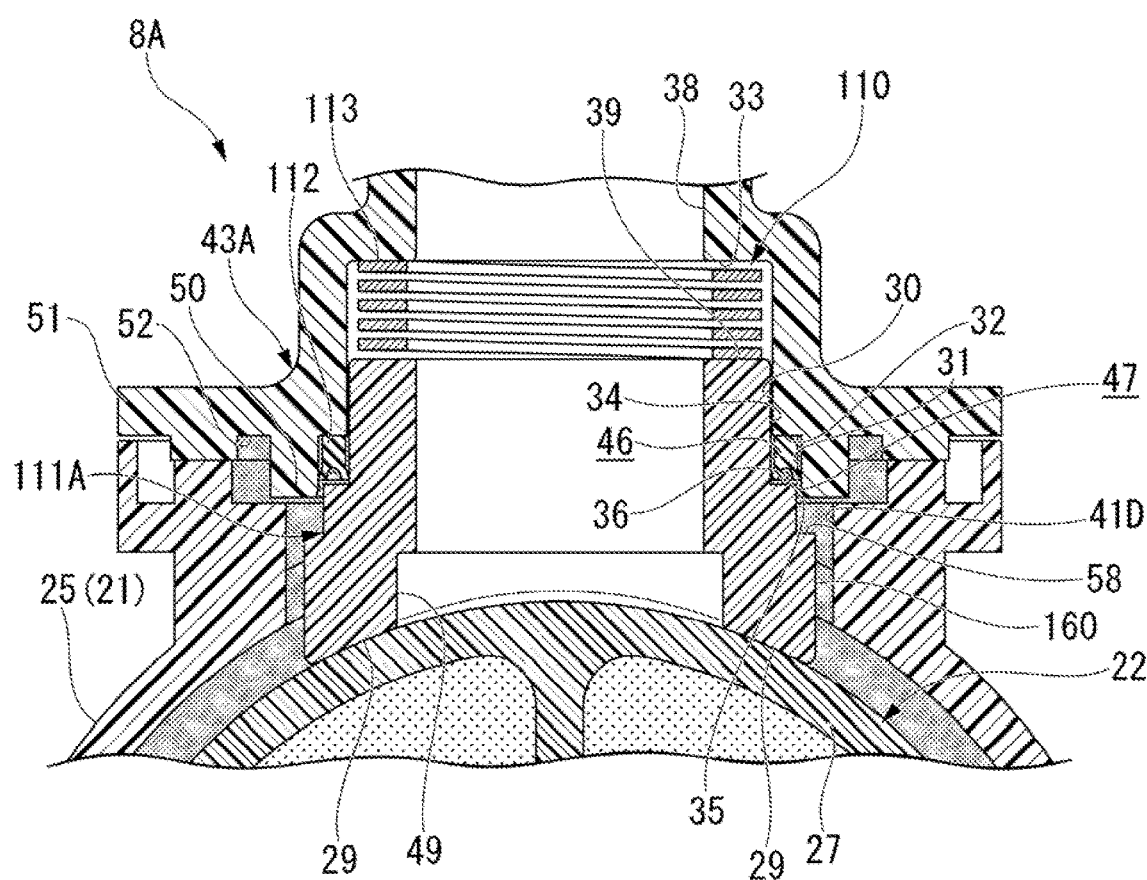
FIG. 12 is a cross-sectional view similar to that in FIG. 7 regarding a third modification example of the control valve according to the embodiment.

In the modification example illustrated in FIG. 12, an enlarged outer circumferential surface 160 increased in diameter in a stepped state from the large diameter outer circumferential surface 35 of the sealing tube member 111A is continuously provided. An end portion of the enlarged outer circumferential surface 160 on the valve body 22 side is formed to continuously come into contact with the valve sliding contact surface 29. The stepped surface connecting the large diameter outer circumferential surface 35 and the enlarged outer circumferential surface 160 to each other constitutes an auxiliary pressure receiving surface 58 directed in a direction opposite to the valve sliding contact surface 29. In the case of this modification example, the liquid pressure of the cooling water inside the valve housing 21 acts on the auxiliary pressure receiving surface 58. Accordingly, for example, even when the size of the seal ring 112 is small and the liquid pressure acting on the connection surface 36 is low, sealing properties of the sealing tube member 111A can be enhanced by setting the valve sliding contact surface 29 based on the foregoing expressions.

In the present modification example, the connection surface 36 of the sealing tube member 111A and the auxiliary pressure receiving surface 58 constitute a biasing pressure receiving surface.

Figure 13:
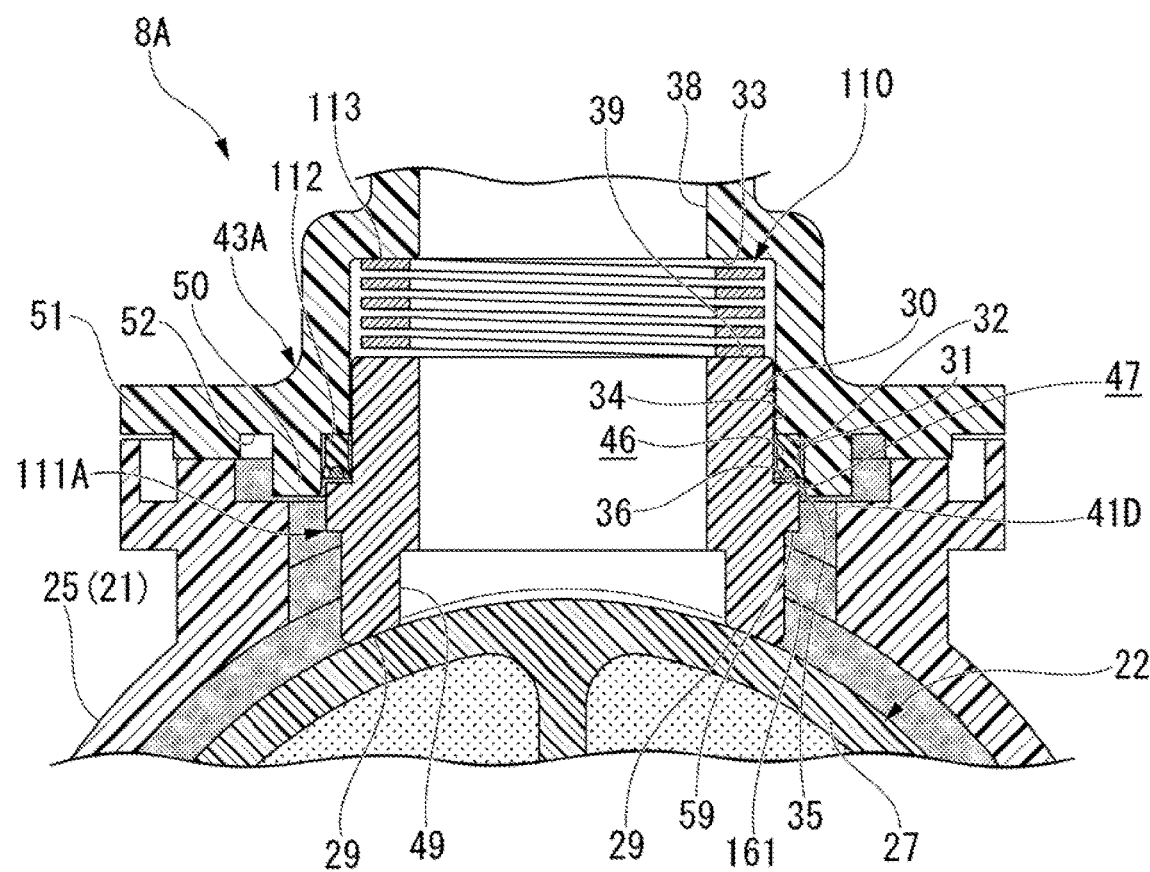
FIG. 13 is a cross-sectional view similar to that in FIG. 7 regarding a fourth modification example of the control valve according to the embodiment.

In the modification example illustrated in FIG. 13, a contracted outer circumferential surface 161 decreased in diameter in a stepped state from the large diameter outer circumferential surface 35 is continuously provided in the end portion of the large diameter outer circumferential surface 35 of the sealing tube member 111A on the side approaching the valve body 22. The end portion of the contracted outer circumferential surface 161 on the valve body 22 side is formed to continuously come into contact with the valve sliding contact surface 29. The stepped surface connecting the large diameter outer circumferential surface 35 and the contracted outer circumferential surface 161 to each other constitutes an auxiliary pressure receiving surface 59 directed in the same direction as the valve sliding contact surface 29. In the case of this modification example, since the liquid pressure of the cooling water inside the valve housing 21 acts on the auxiliary pressure receiving surface 59, a pressing force of the sealing tube member 111A with respect to the valve body 22 can be curbed. Accordingly, for example, even when the size of the seal ring 112 is large and the liquid pressure acting on the connection surface 36 is high, excessive pressing of the sealing tube member 111A is prevented by setting the valve sliding contact surface 29 based on the foregoing expressions, and sealing properties can be enhanced.

In the present modification example, a part on the connection surface 36 of the sealing tube member 111A from which the part corresponding to the area of the auxiliary pressure receiving surface 59 is subtracted constitutes a biasing pressure receiving surface.

Next, a fourth embodiment illustrated in FIGS. 14 to 16 will be described.

Figure 14:
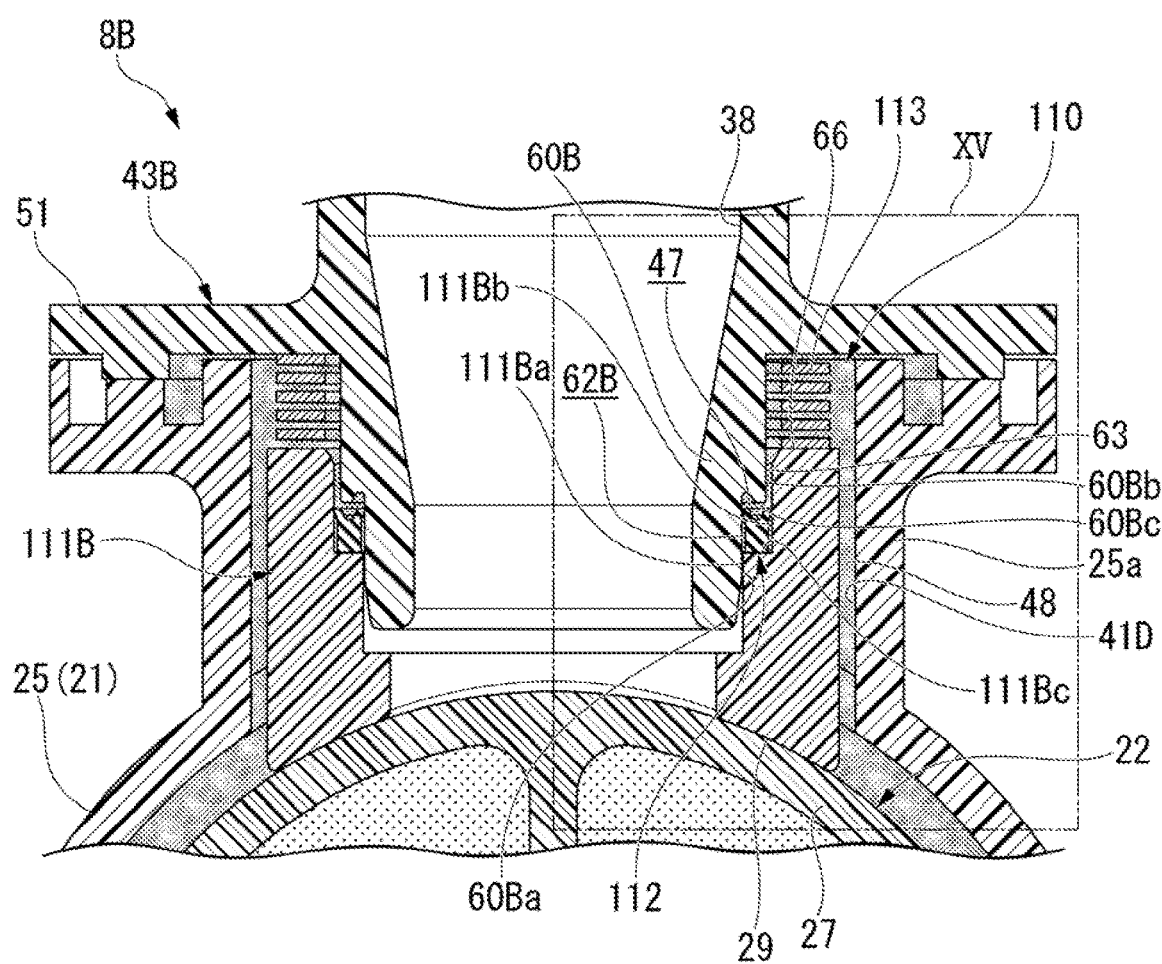
FIG. 14 is a cross-sectional view similar to that in FIG. 7 regarding a control valve according to a fourth embodiment.

FIG. 14 is a cross-sectional view similar to that in FIG. 7 regarding a control valve 8B of the fourth embodiment. FIG. 15 is an enlarged view of a part XV in FIG. 14. FIG. 16 is a perspective view of a part of a joint member 43B. The joint member 43B illustrated in FIG. 16 is a view of the joint member 43B in FIG. 15 obliquely viewed upside down from above.

The control valve 8B of the present embodiment includes the joint member 43B and a sealing tube member 111B. The joint member 43B includes a cylindrical tube portion 60B protruding in the direction of the valve body 22 from an inner end portion (discharge port 41D) of the path hole 38. The tube portion 60B has a small diameter outer circumferential surface 60Ba on which the inner circumferential surface of the sealing tube member 111B is slidably fitted, a large diameter outer circumferential surface 60Bb formed to be increased in diameter in a stepped state from an end portion of the small diameter outer circumferential surface 60Ba on the side away from the valve body 22, and a toric stepped surface 60Bc connecting the small diameter outer circumferential surface 60Ba and the large diameter outer circumferential surface 60Bb to each other.

The joint member 43B includes the joint flange 51 extending radially outward from a proximal portion of the tube portion 60B. The joint flange 51 is joined to an outer circumferential edge portion of the circumferential wall 25a of the valve housing 21 through vibration welding, screwing, or the like.

The sealing tube member 111B has a small diameter inner circumferential surface 111Ba slidably fitted on the small diameter outer circumferential surface 60Ba of the joint member 43B, a large diameter inner circumferential surface 111Bb formed to be increased in diameter in a stepped state from an end portion of the small diameter inner circumferential surface 111Ba to the side away from the valve body 22, and a toric connection surface 111Bc connecting the small diameter inner circumferential surface 111Ba and the large diameter inner circumferential surface 111Bb to each other.

A toric seal accommodation space 62B surrounded by the large diameter inner circumferential surface 111Bb and the small diameter outer circumferential surface 60Ba is provided between the stepped surface 60Bc of the joint member 43B and the connection surface 111Bc of the sealing tube member 111B. The seal ring 112 is accommodated in this seal accommodation space 62B.

The seal ring 112 is an annular elastic member having a Y-shaped cross section and is accommodated in the seal accommodation space 62B such that the Y-shaped opening side is directed to the stepped surface 60Bc side. In the seal ring 112, each of the side end portions of the Y-shaped bifurcated portion comes into tight contact with the large diameter inner circumferential surface 111Bb and the small diameter outer circumferential surface 60Ba. A space between the seal ring 112 and the stepped surface 60Bc of the tube portion 60B constitutes the liquid pressure chamber 47 into which the liquid pressure of the cooling water inside the valve housing 21 is introduced.

In addition, in the sealing tube member 111B, the end portion on the valve body 22 side constitutes the valve sliding contact surface 29. The joint side end surface 66 on a side opposite to the valve sliding contact surface 29 of the sealing tube member 111B is a flat surface having a uniform width. The displacement restriction spring 113 is interposed between the joint side end surface 66 of the sealing tube member 111B and the joint flange 51 of the joint member 43B. The displacement restriction spring 113 restricts a displacement of the sealing tube member 111B in the direction of separation from the valve body 22.

The introduction path 48 is formed between the circumferential wall 25a of the valve housing 21 and the outer circumferential surface of the sealing tube member 111B. The introduction path 48 causes the liquid pressure of the cooling water inside the valve housing 21 to act on the joint side end surface 66 of the sealing tube member 111B. The joint side end surface 66 receives the liquid pressure of the cooling water inside the valve housing 21 in the direction of the valve body 22. In addition, the introduction path 63 is secured between the tube portion 60B of the joint member 43B and the large diameter inner circumferential surface 111Bb of the sealing tube member 111B. The introduction path 63 introduces the liquid pressure of the cooling water inside the valve housing 21 to the liquid pressure chamber 47 via the joint side end surface 66.

In the present embodiment, the joint side end surface 66 of the sealing tube member 111B and a surface on a side facing the inside of the liquid pressure chamber 47 of the seal ring 112 constitute a biasing pressure receiving surface.

An area S1 of the biasing pressure receiving surface in which the joint side end surface 66 and a surface on a side facing the inside of the liquid pressure chamber 47 of the seal ring 112 are combined, and the area S2 of the valve sliding contact surface 29 are set to satisfy Expressions (1) and (2) described in the first embodiment.

Figure 15:
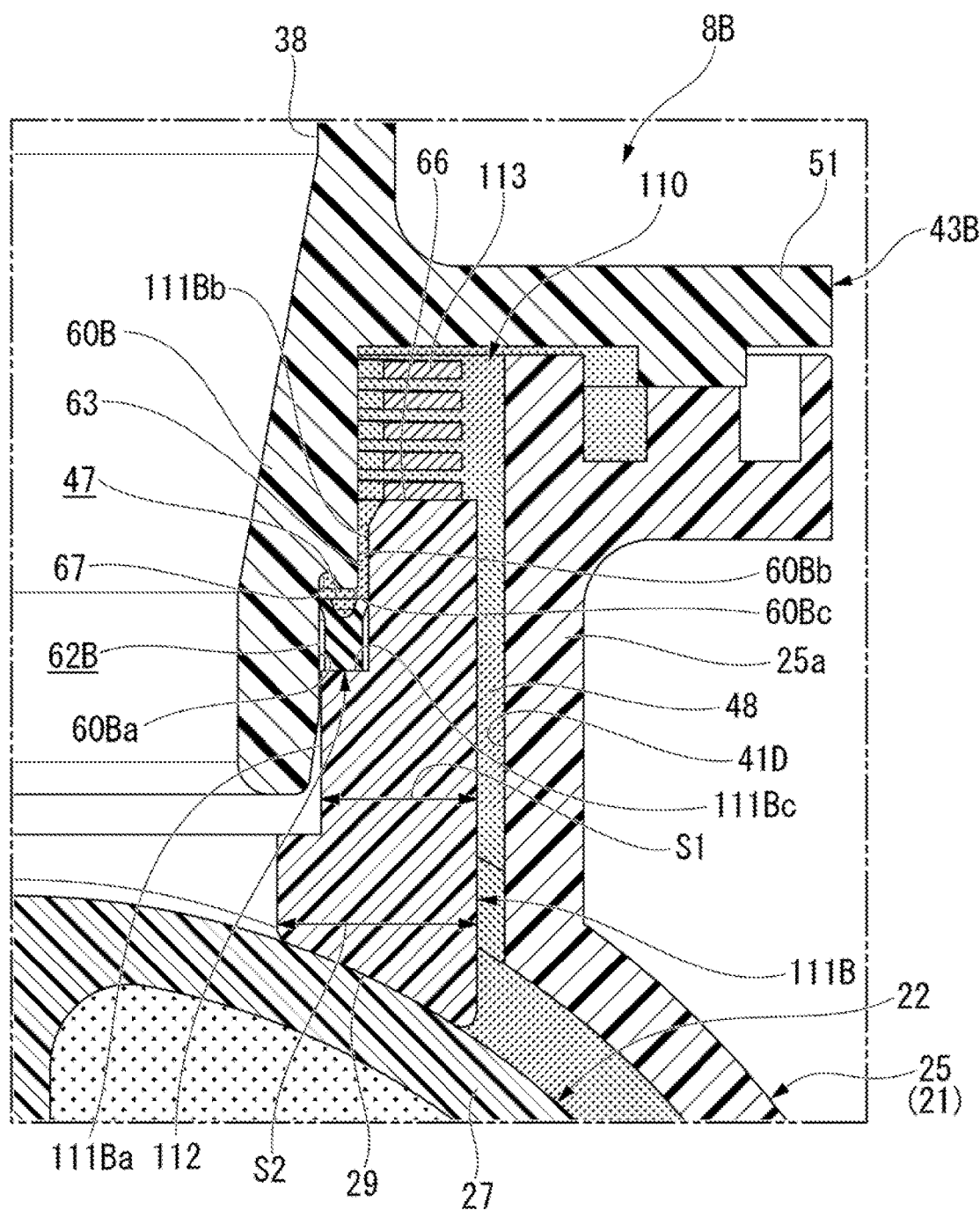
FIG. 15 is an enlarged view of a part XV in FIG. 14 regarding the control valve according to the fourth embodiment.
Figure 16:
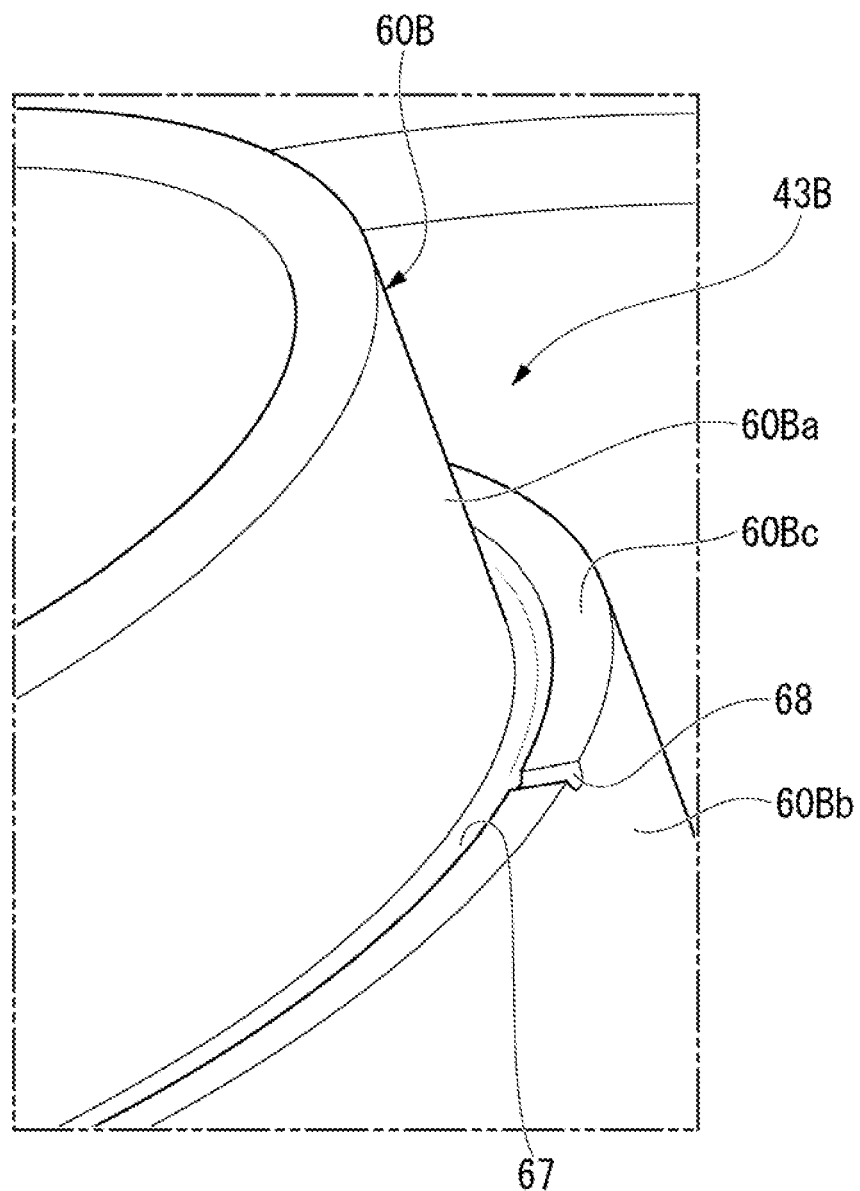
FIG. 16 is a perspective view of a part of a joint member of the control valve according to the fourth embodiment.

As illustrated in FIGS. 15 and 16, on the stepped surface 60Bc of the tube portion 60B, an annular groove 67 is formed in a radially inner region. In the tube portion 60B, a sealing prevention groove 68 causing an inner part (liquid pressure chamber 47) of the annular groove 67 and an outer region (introduction paths 63 and 48) of the tube portion 60B to be electrified is formed in an outer region bulging with respect to the annular groove 67. The seal ring 112 can abut the outer region of the stepped surface 60Bc of the tube portion 60B. Therefore, in a case where there is no sealing prevention groove 68, when the seal ring 112 is strongly pressed to the outer region of the stepped surface 60Bc, it is conceivable that the inside of the liquid pressure chamber 47 tightly adheres and is in a state where no pressurizing force is generated. However, in the present embodiment, since the sealing prevention groove 68 is provided, the inside of the liquid pressure chamber 47 can be prevented from being in a sealed state before it happens.

In addition, in the control valve 8B of the present embodiment, a force generated due to the liquid pressure acting on the seal ring 112 is applied as a force pressing the sealing tube member 111B in the direction of the valve body 22.

However, in the control valve 8B of the present embodiment, since the area S1 of the biasing pressure receiving surface of the sealing tube member 111B and the area S2 of the valve sliding contact surface 29 are set to satisfy Expressions (1) and (2), the sealing tube member 111B can be prevented from pressing the cylinder wall 27 of the valve body 22 with an excessive force.

In addition, in the case of the control valve 8B of the present embodiment, when the seal ring 112 contracts by receiving the pressure inside the liquid pressure chamber 47, a minute pulling force accompanying the contraction thereof acts on the inner circumferential surface of the sealing tube member 111B. However, a direction in which a pulling force acts is not applied as the direction in which the sealing tube member 111B separates from the valve body 22. Therefore, leakage of the cooling water from the valve sliding contact surface 29 of the sealing tube member 111B can be curbed.

Subsequently, a control valve 208 of a fifth embodiment illustrated in FIGS. 17 and 18 will be described.

In the control valve 208 of the present embodiment, one common discharge port and a plurality of inflow ports 237 are provided in the valve housing 21. In the control valve 208, an arbitrary inflow port 237 communicates with the discharge port inside the valve housing 21 in accordance with a turning position of the valve body 22.

Figure 17:
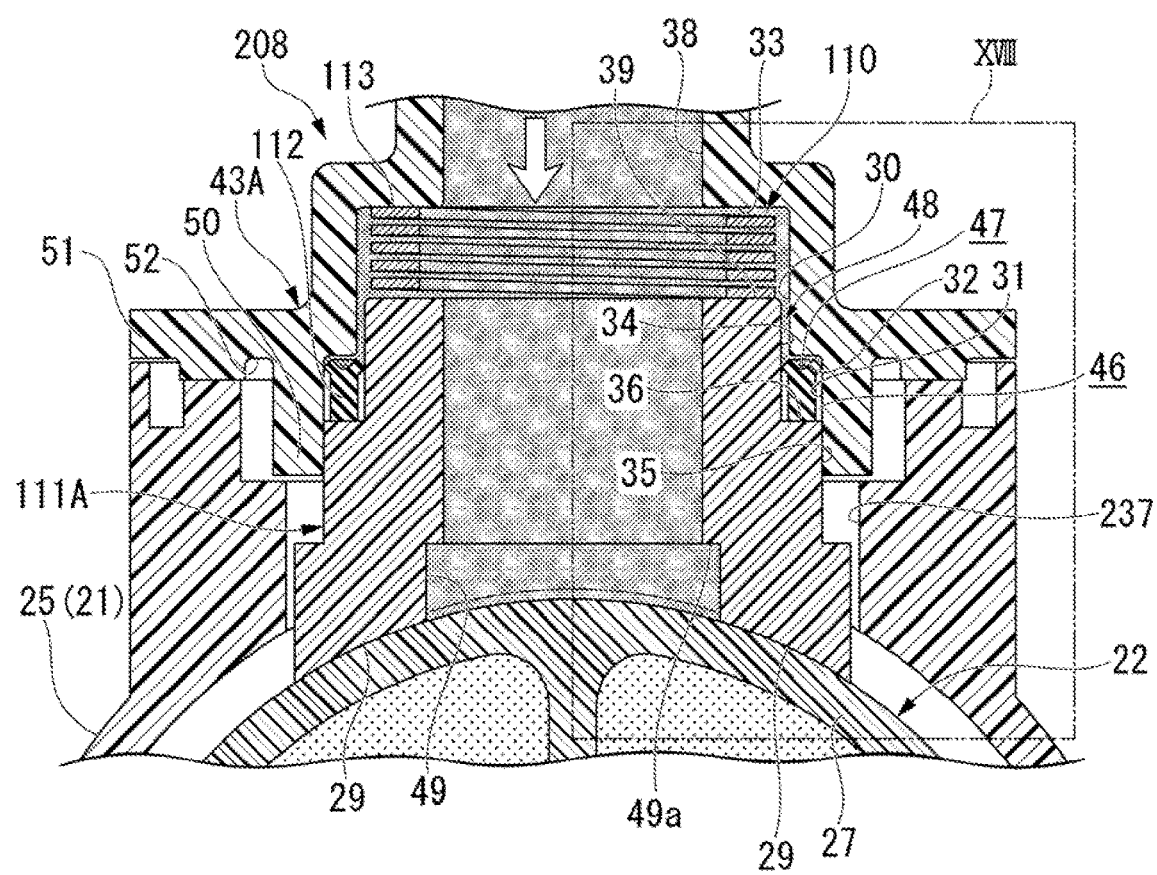
FIG. 17 is a cross-sectional view of a control valve according to a fifth embodiment.
Figure 18:
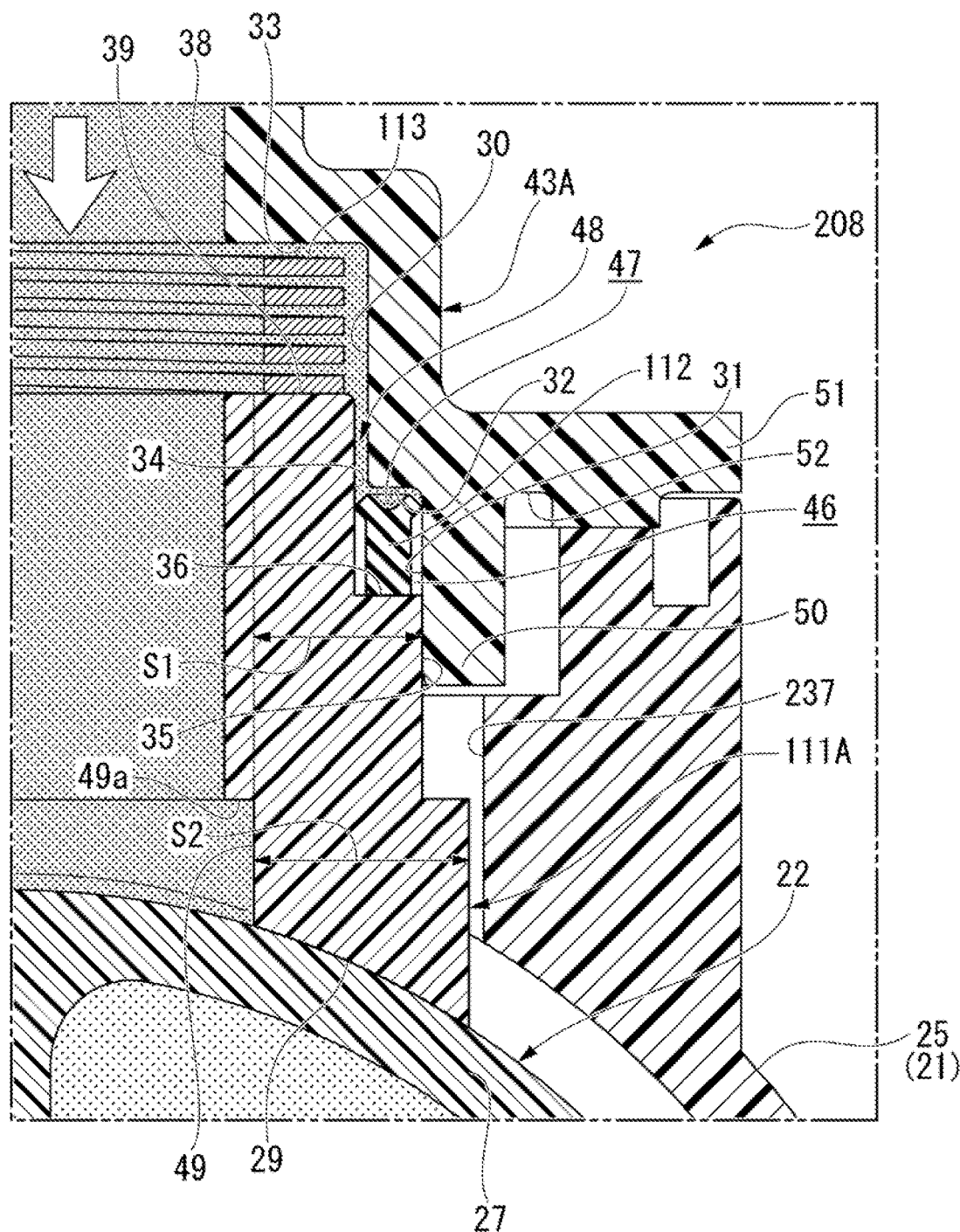
FIG. 18 is an enlarged view of a part XVIII in FIG. 17 regarding the control valve according to the fifth embodiment.

FIG. 17 is a cross-sectional view of the control valve 208 in a direction orthogonal to the axial direction of the valve housing 21 such that one inflow port 237 is shown. FIG. 18 is an enlarged view illustrating a part XVIII in FIG. 17.

The joint member 43A connecting flowing piping is joined to the circumferential edge portion of the inflow port 237, and one end side of the sealing tube member 111A is slidably held by an inner end of the joint member 43A. The valve body 22 having the cylinder wall 27 (circumferential wall portion) is turnably disposed inside the valve housing 21, and a plurality of valve holes (not illustrated) through which the inside and the outside communicate with each other are formed in the cylinder wall 27 of the valve body 22. A space inside the cylinder wall 27 communicates with the common discharge port of the valve housing 21. The valve sliding contact surface 29 which comes into sliding contact with the outer surface of the cylinder wall 27 of the valve body 22 is formed on the other end side of the sealing tube member 111A. The valve sliding contact surface 29 slidably abuts the outer surface of the cylinder wall 27 at a position where at least a part of the valve body 22 overlaps the rotation paths of the valve hole.

On the valve sliding contact surface 29, the entire region over the sealing tube member 111A from the radially inner end to the outer end is formed to have a radius of the same curvature as a region on the outer surface of the cylinder wall 27 of the valve body 22 abutting the sealing tube member 111A.

The valve body 22 allows an inflow of the cooling water (liquid) from an upstream portion of the inflow port 237 to the inner region of the cylinder wall 27 when at a rotation position where the valve holes and the sealing tube member 111A are allowed to communicate with each other. The valve body 22 blocks an inflow of the cooling water (liquid) from the upstream portion of the inflow port 237 to the inner region of the cylinder wall 27 when at a turning position where the valve hole and the sealing tube member 111A are inhibited from communicating with each other. The joint member 43A, the sealing tube member 111A, the valve body 22, and the like have a basic constitution substantially similar to those in the second embodiment.

Similar to the second embodiment, the joint member 43A has the small diameter inner circumferential surface 30, the large diameter inner circumferential surface 31, the first stepped surface 32, and the second stepped surface 33. In addition, similar to the second embodiment, the sealing tube member 111A also has the small diameter outer circumferential surface 34, the large diameter outer circumferential surface 35, the connection surface 36, and the support surface 39. In the sealing tube member 111A, the large diameter outer circumferential surface 35 is slidably fitted into the large diameter inner circumferential surface 31 of the joint member 43A. In addition, the toric seal accommodation space 46 surrounded by the large diameter inner circumferential surface 31 and the small diameter outer circumferential surface 34 is provided between the first stepped surface 32 of the joint member 43A and the connection surface 36 of the sealing tube member 111A.

The seal ring 112 which is an annular elastic member having a Y-shaped cross section is accommodated in the seal accommodation space 46. The seal ring 112 is accommodated in the seal accommodation space 46 such that the Y-shaped opening side is directed to the first stepped surface 32 side. In the seal ring 112, each of the side end portions of the Y-shaped bifurcated portion comes into tight contact with the large diameter inner circumferential surface 31 and the small diameter outer circumferential surface 34. A space between the seal ring 112 and the first stepped surface 32 of the joint member 43A constitutes the liquid pressure chamber 47. In addition, the introduction path 48 for introducing the liquid pressure of the cooling water (liquid pressure in the upstream portion of the inflow port 237) inside the path hole 38 of the joint member 43A to the liquid pressure chamber 47 is provided between the small diameter inner circumferential surface 30 of the joint member 43A and the small diameter outer circumferential surface 34 of the sealing tube member 111A.

In the present embodiment, the liquid pressure of high-pressure cooling water on the upstream side of the inflow port 237 acts on the support surface 39 of the sealing tube member 111A and acts on the connection surface 36 via an upper surface of the seal ring 112. The toric thinned portion 49 is formed on the inner circumferential surface of the sealing tube member 111A on the side approaching the valve body 22, and the liquid pressure of high-pressure cooling water on the upstream side of the inflow port 237 also acts on a stepped surface 49a which is directed downward in the diagram and constitutes the thinned portion 49. Therefore, the liquid pressure of high-pressure cooling water on the upstream side of the inflow port 237 acts as a force in the direction of the valve body 22 on an area S1 obtained by subtracting the area of the stepped surface 49a from the areas of the support surface 39 and the connection surface 36. In the present embodiment, a part obtained by subtracting the part corresponding to the stepped surface 49a from the support surface 39, and the connection surface 36 (upper surface of the seal ring 112) constitute a biasing pressure receiving surface of the sealing tube member 111A.

In addition, in the case of the present embodiment, when the sealing tube member 111A is closed by the valve body 22, the liquid pressure of high-pressure cooling water on the upstream side of the inflow port 237 acts on an inner circumferential region on the valve sliding contact surface 29 of the sealing tube member 111A. At this time, the high-pressure cooling water leaks out into the valve housing 21 little by little through the minute gap between the valve sliding contact surface 29 and the cylinder wall 27 of the valve body 22.

In the present embodiment, in consideration of these, the area S1 of the biasing pressure receiving surface and the area S2 of the valve sliding contact surface 29 are set to satisfy the following Expressions (1) and (2).

$$S1 < S2 \leq S1/k \quad (1)$$

$$\alpha \leq k < 1 \quad (2)$$

Here, k indicates a pressure reduction constant of a liquid flowing through a minute gap between the valve sliding contact surface and the valve body, and $\alpha$ indicates a lower limit value for the pressure reduction constant determined based on physical properties of a liquid.

In the control valve 208 according to the present embodiment, for a reason similar to that in the case of the foregoing embodiment, the sealing tube member 111A is prevented from pressing the cylinder wall 27 of the valve body 22 with an excessive force, and the end portion of the sealing tube member 111A can be appropriately opened and closed by the cylinder wall 27 of the valve body 22.

Next, a sixth embodiment illustrated in FIGS. 19 and 20 will be described.

In a control valve 208B of the present embodiment, similar to the fifth embodiment, one common discharge port and a plurality of inflow ports 237 are provided in the valve housing 21. In the control valve 208B, an arbitrary inflow port 237 communicates with the discharge port inside the valve housing 21 in accordance with a turning position of the valve body 22.

Figure 19:
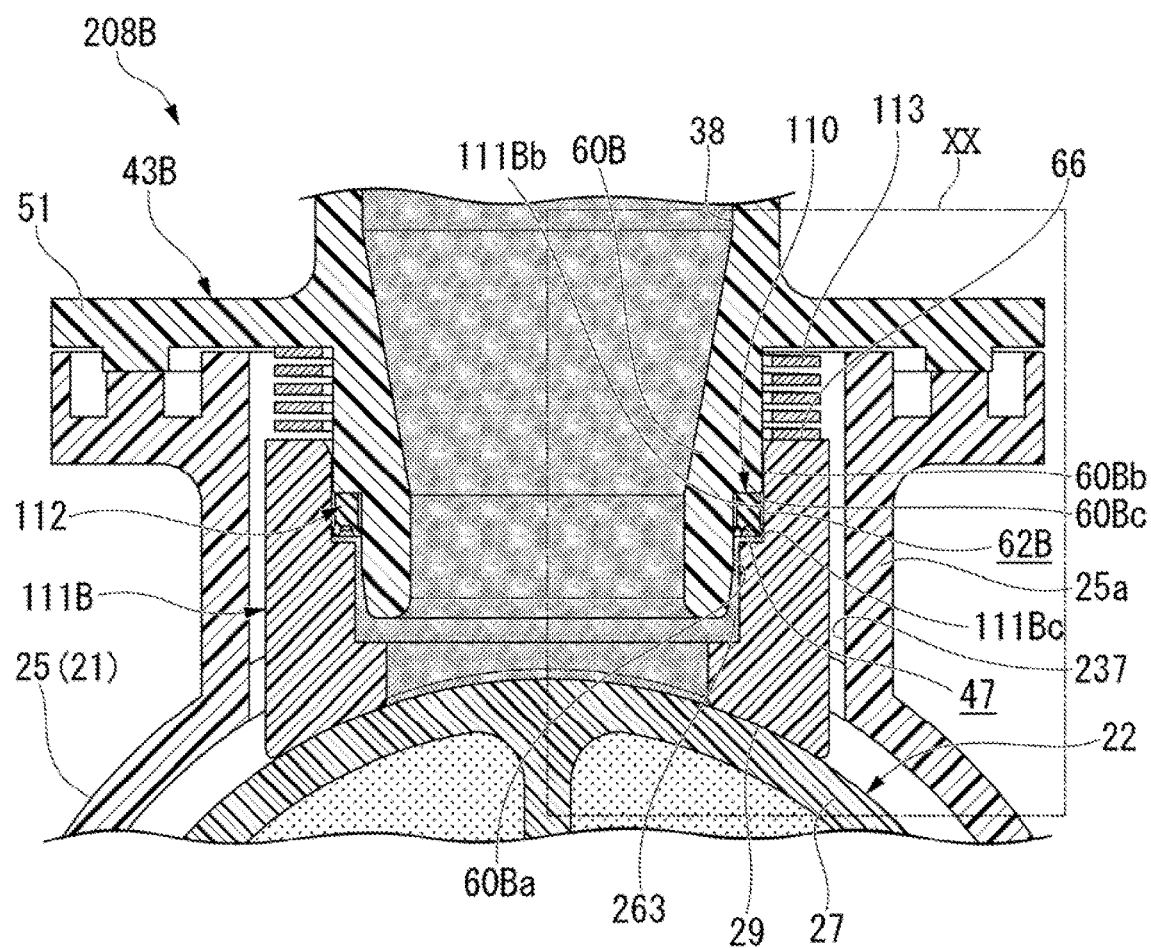
FIG. 19 is a cross-sectional view of a control valve according to a sixth embodiment.
Figure 20:
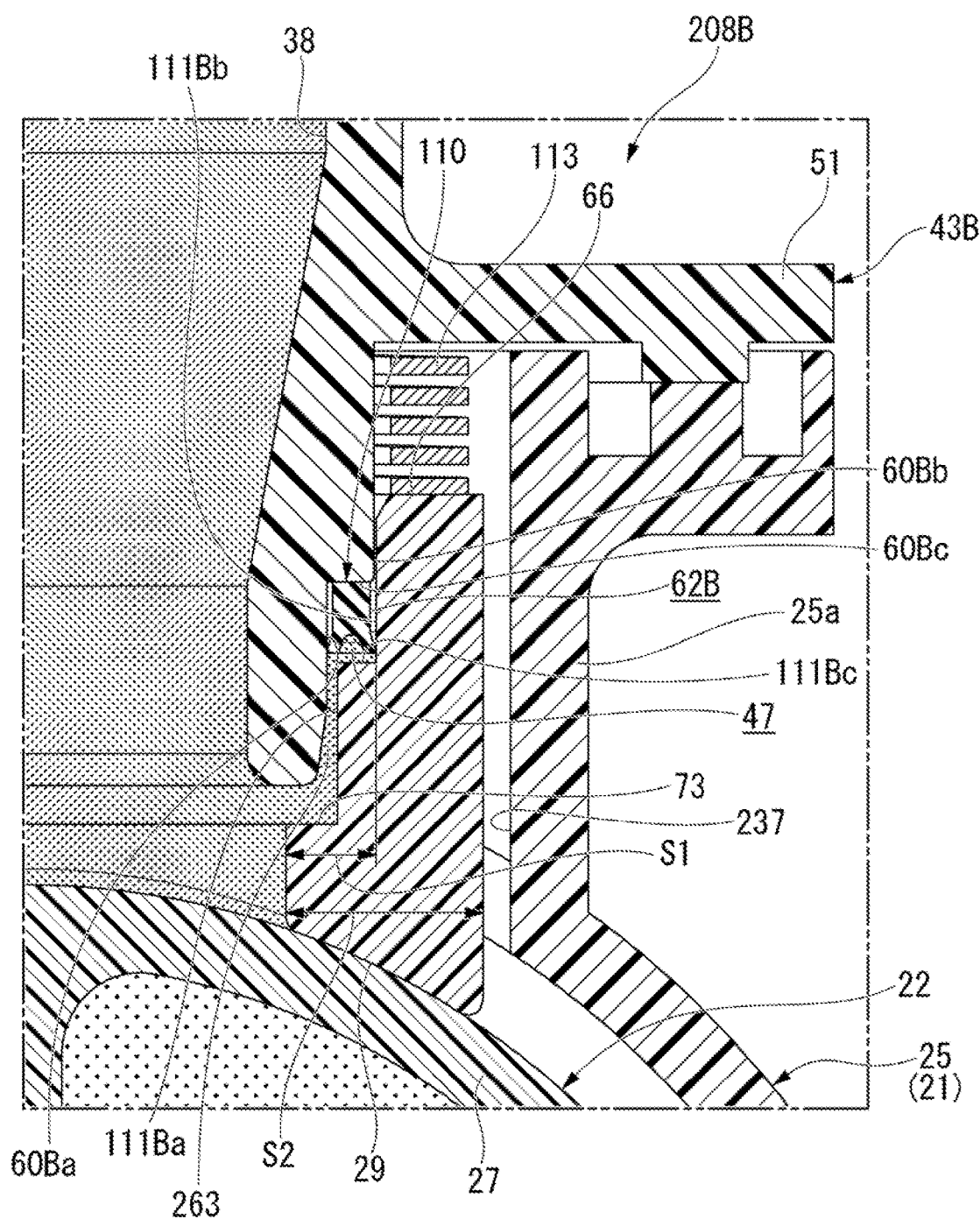
FIG. 20 is an enlarged view of a part XX in FIG. 19 regarding the control valve according to the sixth embodiment.

FIG. 19 is a cross-sectional view of the control valve 208B similar to FIG. 17 of the fifth embodiment. FIG. 20 is an enlarged view illustrating a part XX in FIG. 19.

The control valve 208B of the present embodiment includes the joint member 43B and the sealing tube member 111B. The joint member 43B includes a cylindrical tube portion 60B protruding in the direction of the valve body 22 from the inner end portion of the path hole 38. The tube portion 60B has the large diameter outer circumferential surface 60Bb on which the inner circumferential surface of the sealing tube member 111B is slidably fitted, the small diameter outer circumferential surface 60Ba formed to be decreased in diameter in a stepped state from the end portion of the large diameter outer circumferential surface 60Bb on the side approaching the valve body 22, and the toric stepped surface 60Bc connecting the large diameter outer circumferential surface 60Bb and the small diameter outer circumferential surface 60Ba to each other.

The joint member 43B includes the joint flange 51 extending radially outward from the proximal portion of the tube portion 60B. The joint flange 51 is joined to the outer circumferential edge portion of the circumferential wall 25a of the valve housing 21 through vibration welding, screwing, or the like.

The sealing tube member 111B has the large diameter inner circumferential surface 111Bb slidably fitted on the large diameter outer circumferential surface 60Bb of the joint member 43B, the small diameter inner circumferential surface 111Ba formed to be decreased in diameter in a stepped state from the end portion of the large diameter inner circumferential surface 111Bb on the side approaching the valve body 22, and the toric connection surface 111Bc connecting the large diameter inner circumferential surface 111Bb and the small diameter inner circumferential surface 111Ba to each other.

The toric seal accommodation space 62B surrounded by the large diameter inner circumferential surface 111Bb and the small diameter outer circumferential surface 60Ba is provided between the stepped surface 60Bc of the joint member 43B and the connection surface 111Bc of the sealing tube member 111B. The seal ring 112 is accommodated in the seal accommodation space 62B.

The seal ring 112 is an annular elastic member having a Y-shaped cross section. The seal ring 112 is accommodated in the seal accommodation space 62B such that the Y-shaped opening side is directed to the connection surface 111Bc side of the sealing tube member 111B. In the seal ring 112, each of the side end portions of the Y-shaped bifurcated portion comes into tight contact with the large diameter inner circumferential surface 111Bb and the small diameter outer circumferential surface 60Ba. A space between the seal ring 112 and the connection surface 111Bc of the sealing tube member 111B constitutes the liquid pressure chamber 47 into which the liquid pressure of the cooling water inside the path hole 38 (cooling water on the upstream side of the inflow port 237) is introduced.

In the sealing tube member 111B, the end portion on the valve body 22 side constitutes the valve sliding contact surface 29. The joint side end surface 66 on a side opposite to the valve sliding contact surface 29 of the sealing tube member 111B is a flat surface having a uniform width. The displacement restriction spring 113 is interposed between the joint side end surface 66 of the sealing tube member 111B and the joint flange 51 of the joint member 43B. The displacement restriction spring 113 restricts a displacement of the sealing tube member 111B in the direction of separation from the valve body 22.

An introduction path 263 is secured between the small diameter outer circumferential surface 60Ba of the joint member 43B and the small diameter inner circumferential surface 111Ba of the sealing tube member 111B. The introduction path 263 introduces the pressure of the cooling water inside the path hole 38 (cooling water on the upstream side of the inflow port 237) of the joint member 43B to the liquid pressure chamber 47.

In addition, a toric pressure receiving surface 73 bent in the diameter reducing direction is formed in the end portion on the small diameter inner circumferential surface 111Ba of the sealing tube member 111B on the valve body side. The pressure receiving surface 73 is formed to face a side opposite to the valve sliding contact surface 29. The cooling water inside the path hole 38 acts on the connection surface 111Bc of the sealing tube member 111B facing the liquid pressure chamber 47 and the pressure receiving surface 73. In the present embodiment, the connection surface 111Bc and the pressure receiving surface 73 constitute a biasing pressure receiving surface.

An area S1 of the biasing pressure receiving surface in which the connection surface 111Bc and the pressure receiving surface 73 are combined, and the area S2 of the valve sliding contact surface 29 are set to satisfy Expressions (1) and (2) described in the fifth embodiment.

Therefore, in the cases of the control valve 208B of the present embodiment as well, the sealing tube member 111B is prevented from pressing the cylinder wall 27 of the valve body 22 with an excessive force, and the end portion of the sealing tube member 111B can be appropriately opened and closed by the cylinder wall 27 of the valve body 22.

In addition, in the control valve 208B of the present embodiment, the liquid pressure chamber 47 is formed between the seal ring 112 and the connection surface 111Bc of the sealing tube member 111B, and the pressure inside the valve housing 21 is introduced into the liquid pressure chamber 47. At this time, the liquid pressure which has been introduced into the liquid pressure chamber 47 directly pressurizes the connection surface 111Bc of the sealing tube member 111B in the direction of the valve body 22.

In addition, in the case of the present embodiment, the liquid pressure acting on the seal ring 112 from the liquid pressure chamber 47 is received by the stepped surface 60Bc of the joint member 43B. Therefore, a pressing force acting on the sealing tube member 111B in the direction of the valve body 22 can be stabilized at all times without being affected by the state of the seal ring 112.

In this specification, when a sealing tube member includes the same area parts on which the same pressure acts in directions opposite to each other, "the biasing pressure receiving surface" means a part on the pressure receiving surface opposite to the valve sliding contact surface, except for a region of the same area parts.

Hereinabove, preferable examples of the present invention have been described. However, the present invention is not limited to these examples. The constitutions can be subjected to addition, omission, replacement, and other changes within a range not departing from the gist of the present invention. The present invention is not limited by the foregoing description and is limited by only the scope of the accompanying claims.

For example, in the foregoing embodiments, when the sealing tube member 111, 111A, or 111B is at the initial position, the displacement restriction spring 113 is set such that its biasing force does not substantially act on the sealing tube member 111, 111A, or 111B. However, as long as the sealing tube member 111, 111A, or 111B is within a range in which it is not pressed to the valve body 22 with an excessive force, a biasing force of the displacement restriction spring 113 may act on the sealing tube member 111, 111A, or 111B even when the sealing tube member 111, 111A, or 111B is at the initial position.

In the foregoing embodiments, a case where each of the valve body 22 (cylinder wall 27) and the valve housing 21 (circumferential wall of the housing main body 25) is formed to have a cylindrical shape (having a uniform diameter in the axial direction throughout the entirety) has been described. However, the embodiments are not limited to this constitution. That is, as long as the cylinder wall 27 has a constitution in which it can rotate inside the circumferential wall of the housing main body 25, the outer diameter of the cylinder wall 27 and the inner diameter of the circumferential wall of the housing main body 25 may be changed in the axial direction. In this case, for example, the cylinder wall 27 and the circumferential wall of the housing main body 25 can employ various shapes, such as a spherical shape (shape decreased in diameter toward both end portions from a middle portion in the axial direction), a saddle type (shape increased in diameter toward both end portions from a middle portion in the axial direction), a shape having a three-dimensionally curved surface such as a shape in which a plurality of spherical shapes or saddle types are connected in the axial direction, a tapered shape (shape of which the diameter gradually changes from a first side to a second side in the axial direction), and a stepped shape (shape of which the diameter changes in steps from a first side to a second side in the axial direction).

In addition, in the foregoing embodiments, a case where the seal ring 112 is constituted of an annular elastic member having a Y-shaped cross section has been described. However, the embodiments are not limited to this constitution. The seal ring 112 can employ various shapes such as an annular elastic member having an O-shaped cross section or an X-shaped cross section.

REFERENCE SIGNS LIST 8, 8A, 8B, 108, 208, 208B Control valve
21 Valve housing
22 Valve body
27 Cylinder wall (circumferential wall portion)
28A, 28C, 28D, 28E Valve hole
36 Connection surface (biasing pressure receiving surface)
37 Inflow port
41A, 41C, 41D, 41E Discharge port
43, 43A, 43B Joint member
111, 111A, 111B Sealing tube member
113 Displacement restriction spring
237 Inflow port

The invention claimed is:

1. A control valve comprising:
a valve housing which has an inflow port for causing a liquid to flow in from outside and a discharge port for discharging a liquid that has flowed in to the outside;
a joint member which is joined to a circumferential edge of the discharge port;
a valve body which is rotatably disposed inside the valve housing and has a circumferential wall portion in which a valve hole for communication between the inside and the outside is formed; and
a sealing tube member in which one end side is held by the joint member in a state of communicating with the discharge port, and a valve sliding contact surface slidably abutting an outer surface of the circumferential wall portion at a position where at least a part of the valve body overlaps a rotation path of the valve hole is provided on the other end side,
wherein the valve body allows an outflow of a liquid to the discharge port from an inner region of the circumferential wall portion when at a rotation position where the valve hole and the sealing tube member are allowed to communicate with each other, and the valve body controls or blocks an outflow of a liquid to the discharge port from the inner region of the circumferential wall portion when at a rotation position where the valve hole and the sealing tube member are inhibited from communicating with each other,
wherein the sealing tube member has a biasing pressure receiving surface which receives a pressure of a liquid inside the valve housing and biases the sealing tube member to the valve body side, and
wherein an area S1 of the biasing pressure receiving surface and an area S2 of the valve sliding contact surface of the sealing tube member are set to satisfy Expressions (1) and (2), $$S1 < S2 \leq S1/k \quad (1)$$

$$\alpha \leq k < 1 \quad \ldots (2)$$

where k: a pressure reduction constant of a liquid flowing through a minute gap between the valve sliding contact surface and the valve body, and
α: a lower limit value for the pressure reduction constant determined based on physical properties of a liquid.

2. The control valve according to claim 1,
wherein the valve sliding contact surface of the sealing tube member is constituted of an arc surface having a radius of the same curvature as a region on the outer surface of the circumferential wall portion abutting the sealing tube member.

3. The control valve according to claim 2,
wherein a displacement restriction spring restricting a displacement of the sealing tube member is provided between the joint member and the sealing tube member.

4. The control valve according to claim 1,
wherein a displacement restriction spring restricting a displacement of the sealing tube member is provided between the joint member and the sealing tube member.

5. A control valve comprising:
a valve housing which has an inflow port for causing a liquid to flow in from outside and a discharge port for discharging a liquid that has flowed in to the outside;
a joint member which is joined to a circumferential edge of the inflow port;
a valve body which is rotatably disposed inside the valve housing and has a circumferential wall portion in which a valve hole for communication between the inside and the outside is formed; and
a sealing tube member in which one end side is held by the joint member in a state of communicating with the inflow port, and a valve sliding contact surface slidably abutting an outer surface of the circumferential wall portion at a position where at least a part of the valve body overlaps a rotation path of the valve hole is provided on the other end side,
wherein the valve body allows an inflow of a liquid to an inner region of the circumferential wall portion from an upstream portion of the inflow port when at a rotation position where the valve hole and the sealing tube member are allowed to communicate with each other, and the valve body controls or blocks an inflow of a liquid to the inner region of the circumferential wall portion from the upstream portion of the inflow port when at a rotation position where the valve hole and the sealing tube member are inhibited from communicating with each other,
wherein the sealing tube member has a biasing pressure receiving surface which receives a pressure of a liquid in the upstream portion of the inflow port and biases the sealing tube member to the valve body side, and
wherein an area S1 of the biasing pressure receiving surface and an area S2 of the valve sliding contact surface of the sealing tube member are set to satisfy Expressions (1) and (2), $$S1 < S2 \leq S1/k \quad (1)$$

$$\alpha \leq k < 1 \quad (2)$$

where k: a pressure reduction constant of a liquid flowing through a minute gap between the valve sliding contact surface and the valve body, and α: a lower limit value for the pressure reduction constant determined based on physical properties of a liquid.

6. The control valve according to claim 5,
wherein the valve sliding contact surface of the sealing tube member is constituted of an-arc surface having a radius of the same curvature as a region on the outer surface of the circumferential wall portion abutting the sealing tube member.

7. The control valve according to claim 6,
wherein a displacement restriction spring restricting a displacement of the sealing tube member is provided between the joint member and the sealing tube member.

8. The control valve according to claim 5,
wherein a displacement restriction spring restricting a displacement of the sealing tube member is provided between the joint member and the sealing tube member.

* * * * *